US006535645B2

(12) United States Patent
Bright et al.

(10) Patent No.: US 6,535,645 B2
(45) Date of Patent: Mar. 18, 2003

(54) ERROR REDUCTION IN TRANSFORMED DIGITAL DATA

(75) Inventors: Martin James Bright, Clare College (GB); Joan LaVerne Mitchell, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/042,792

(22) Filed: Jan. 9, 2002

(65) Prior Publication Data

US 2002/0081035 A1 Jun. 27, 2002

Related U.S. Application Data

(62) Division of application No. 09/186,249, filed on Nov. 4, 1998, now Pat. No. 6,393,155.

(51) Int. Cl.[7] .................................................. G06K 9/36
(52) U.S. Cl. ............. 382/248; 375/240.18; 375/240.27; 375/240.2
(58) Field of Search ................................ 382/232–250; 375/240–243; 343/409.1–420

(56) References Cited

U.S. PATENT DOCUMENTS

| | | | | |
|---|---|---|---|---|
| 5,568,199 A | * | 10/1996 | Kajimoto et al. | 375/240.23 |
| 5,646,960 A | * | 7/1997 | Sonohara et al. | 375/340 |
| 6,178,205 B1 | * | 1/2001 | Cheung et al. | 375/240.29 |
| 6,256,349 B1 | * | 7/2001 | Suzuki et al. | 375/240.18 |

* cited by examiner

*Primary Examiner*—Jingge Wu
(74) *Attorney, Agent, or Firm*—Louis P. Herzberg

(57) ABSTRACT

This invention solves problems due to employing error degraded data in digital processing. It particularly solves multi-generation problems wherein transform data degrade during each inverse transform and forward transform cycle even without any processing due to the rounding and clipping errors. It provides methods, systems and devices for reduced-error processing of transform-coded data. After inverse transformation of transform data, high-precision numbers are converted to integers and clipped to an allowed range forming converted data. High-precision differences are obtained by subtracting the high-precision output of the inverse transform from the converted data. The converted data can be manipulated and sent to output devices which expect integer data. Processed high-precision numbers are formed by adding the high-precision differences to the processed converted data. Thus, the rounding and clipping errors are greatly reduced in the processed high-precision numbers. The processed high-precision numbers are used for further processing including forward transforming back to the transform domain. In another embodiment of the present invention processed high-precision numbers are generated by selecting the high-precision numbers instead of the manipulated converted data whenever the manipulated converted data still equals the converted data. Although advantageous to many applications employing digital transformed data, the invention is particularly advantageous for use in digital studios during editing of MPEG-coded, JPEG-coded and wavelet-coded video and audio data.

24 Claims, 34 Drawing Sheets

800

804 $\begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 63 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix}$

814 $\begin{pmatrix} 17 & 18 & 24 & 47 & 99 & 99 & 99 & 99 \\ 18 & 21 & 26 & 66 & 99 & 99 & 99 & 99 \\ 24 & 26 & 56 & 99 & 99 & 99 & 99 & 99 \\ 47 & 66 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \end{pmatrix}$

874 $\begin{pmatrix} -34 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 5 \end{pmatrix}$

↓ INVERSE QUANTIZE

878 $\begin{pmatrix} -544 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 495 \end{pmatrix}$

↓ INVERSE DCT & ROUND

882 $\begin{pmatrix} 65 & 47 & 80 & 36 & 84 & 40 & 73 & 55 \\ 47 & 98 & 3 & 127 & -7 & 117 & 22 & 73 \\ 80 & 3 & 146 & -41 & 161 & -26 & 117 & 40 \\ 36 & 127 & -41 & 179 & -59 & 161 & -7 & 84 \\ 84 & -7 & 161 & -59 & 179 & -41 & 127 & 36 \\ 40 & 117 & -26 & 161 & -41 & 146 & 3 & 80 \\ 73 & 22 & 117 & -7 & 127 & 3 & 98 & 47 \\ 55 & 73 & 40 & 84 & 36 & 80 & 47 & 65 \end{pmatrix}$

↓

FIG. 8(f)

ERROR REDUCTION IN TRANSFORMED DIGITAL DATA

CROSS REFERENCES

This is a divisional of application Ser. No. 09/186,249, filed Nov. 4, 1998 now U.S. Pat. No. 6,393,155.

The present application is related to the following applications even dated herewith: 09/186247, entitled, "Reduced-error processing of transformed digital data," by inventors M. Bright et al., and 09/186245, entitled, "Transform-domain correction of real-domain errors," by inventors J. Mitchell et al., which are incorporated herein by reference.

FIELD OF THE INVENTION

This invention relates to transform coding of digital data, specifically to real domain processing of transform data. More particularly, this invention relates to reduced-error digital processing of inverse transformed data.

BACKGROUND OF THE INVENTION

Transform coding is the name given to a wide family of techniques for data coding, in which each block of data to be coded is transformed by some mathematical function prior to further processing. A block of data may be a part of a data object being coded, or may be the entire object. The data generally represent some phenomenon, which may be for example a spectral or spectrum analysis, an image, an audio clip, a video clip, etc. The transform function is usually chosen to reflect some quality of the phenomenon being coded; for example, in coding of audio, still images and motion pictures, the Fourier transform or Discrete Cosine Transform (DCT) can be used to analyze the data into frequency terms or coefficients. Given the phenomenon being coded, there is generally a concentration of the information into a few frequency coefficients. Therefore, the transformed data can often be more economically encoded or compressed than the original data. This means that transform coding can be used to compress certain types of data to minimize storage space or transmission time over a communication link.

An example of transform coding in use is found in the Joint Photographic Experts Group (JPEG) international standard for still image compression, as defined by *ITU-T Rec.* T.81 (1992)|TSO/IEC 10918-1:1994, Information technology—Digital compression and coding of continuous-tone still images, Part 1: *Requirements and Guidelines*. Another example is the Moving Pictures Experts Group (MPEG) international standard for motion picture compression, defined by ISO/IEC 11172:1993, *Information Technology—Coding* of moving pictures and associated audio for digital storage media at up to about 1,5 Mbits/s. This MPEG-1 standard defines systems for both video compression (Part 2 of the standard) and audio compression (Part 3). A more recent MPEG video standard (MPEG-2) is defined by *ITU-T Rec.* H.262|*ISO/IEC* 13818-2: 1996 *Information Technology— of moving pictures and associated audio—Part* 2: video. A newer audio standard is ISO/IEC 13818-3: 1996 *Information Technology—Generic Coding of moving pictures and associated audio—Part* 3: audio. All three image international data compression standards use the DCT on 8×8 blocks of samples to achieve image compression. DCT compression of images is used herein to give illustrations of the general concepts put forward below; a complete explanation can be found in Chapter 4 "The Discrete Cosine Transform (DCT)" in W. B. Pennebaker and J. L. Mitchell, JPEG: *Still Image Data Compression Standard*, Van Nostrand Reinhold: New York, (1993).

Wavelet coding is another form of transform coding. Special localized basis functions allow wavelet coding to preserve edges and small details. For compression the transformed data is usually quantized. Wavelet coding is used for fingerprint identification by the FBI. Wavelet coding is a subset of the more general subband coding technique. Subband coding uses filter banks to decompose the data into particular bands. Compression is achieved by quantizing the lower frequency bands more finely than the higher frequency bands while sampling the lower frequency bands more coarsely than the higher frequency bands. A summary of wavelet, DCT, and other transform coding is given in Chapter 5 "Compression Algorithms for Diffuse Data" in Roy Hoffman, *Data Compression in Digital Systems*, Chapman and Hall: New York, (1997).

In any technology and for any phenomenon represented by digital data, the data before a transformation is performed are referred to as being "in the real domain". After a transformation is performed, the new data are often called "transform data" or "transform coefficients", and referred to as being "in the transform domain". The function used to take data from the real domain to the transform domain is called the "forward transform". The mathematical inverse of the forward transform, which takes data from the transform domain to the real domain, is called the respective "inverse transform".

In general, the forward transform will produce real-valued data, not necessarily integers. To achieve data compression, the transform coefficients are converted to integers by the process of quantization. Suppose that $(\lambda_i)$ is a set of real-valued transform coefficients resulting from the forward transform of one unit of data. Note that one unit of data may be a one-dimensional or two-dimensional block of data samples or even the entire data. The "quantization values" $(q_i)$ are parameters to the encoding process. The "quantized transform coefficients" or "transform-coded data" are the sequence of values $(a_i)$ defined by the quantization function Q:

$$a_i = Q(\lambda_i) = \left\lfloor \frac{\lambda_i}{q_i} + 0.5 \right\rfloor \quad (1)$$

where $|x|$ means, as usual, the greatest integer less than or equal to x. The resulting integers are then passed on for possible further encoding or compression before being stored or, transmitted. To decode the data, the quantized coefficients are multiplied by the quantization values to give new "dequantized coefficients" $(\lambda_i')$ given by $$\lambda_i' q_i a_i. \quad (2)$$

The process of quantization followed by dequantization (also called inverse quantization) can thus be described as "rounding to the nearest multiple of $q_i$". The quantization values are chosen so that the loss of information in the quantization step is within some specified bound. For example, for audio or image data, one quantization level is usually the smallest change in data that can be perceived. It is quantization that allows transform coding to achieve good data compression ratios. A good choice of transform allows quantization values to be chosen which will significantly cut down the amount of data to be encoded. For example, the DCT is chosen for image compression because the frequency components which result produce almost independent responses from the human visual system. This means that the coefficients relating to those components to which the visual system is less sensitive, namely the high-frequency components, may be quantized using large a quantization values without perceptible loss of image quality. Coefficients relating to components to which the visual system is more sensitive, namely the low-frequency components, are quantized using smaller quantization values.

The inverse transform also generally produces non-integer data. Usually the decoded data are required to be in integer form. For example, systems for the playback of audio data or the display of image data generally accept input in the form of integers. For this reason, a transform decoder generally includes a step that converts the non-integer data from the inverse transform to integer data, either by truncation or by rounding to the nearest integer. There is also often a limit on the range of the integer data output from the decoding process in order that the data may be stored in a given number of bits. For this reason the decoder al so often includes a "clipping" stage that ensures that the output data are in an acceptable range. If the acceptable range is [a,b], then all values less than a are changed to a, and all values greater than b are changed to b.

These rounding and clipping processes are often considered an integral part of the decoder, and it is these which are the cause of inaccuracies in decoded data and in particular when decoded data are re-encoded. For example, the JPEG standard (Part 1) specifies that a source image sample is defined as an integer with precision P bits, with any value in the range 0 to $2^{**}P-1$. The decoder is expected to reconstruct the output from the inverse discrete cosine transform (IDCT) to the specified precision. For the baseline JPEG coding P is defined to be 8; for other DCT-based coding P can be 8 or 12. The MPEG-2 video standard states in Annex A (Discrete cosine transform) "The input to the forward transform and the output from the inverse transform is represented with 9 bits."

For JPEG the compliance test data for the encoder source image test data and the decoder reference test data are 8 bit/sample integers. Even though rounding to integers is typical, some programming languages convert from floating point to integers by truncation. Implementations in software that accept this conversion to integers by truncation introduce larger errors into the real-domain integer output from the inverse transform.

The term "high-precision" is used herein to refer to numerical values which are stored to a precision more accurate than the precision used when storing the values as integers. Examples of high-precision numbers are floating-point or fixed-point representations of numbers.

SUMMARY OF THE INVENTION

In light of the problems described above regarding inaccuracies caused by digital processing techniques and by such things as rounding and clipping after the inverse transform of transform data, one aspect of this invention provides a method for processing transform data in the real domain. This method reduces the undesired errors in the data produced by such things as rounding to integers and clipping to an allowed range after the inverse transform. In an embodiment, this method includes: performing the inverse transform of the transform data such that the real-domain data produced are in the form of high-precision numbers; converting the high-precision numbers to integers and clipping to an allowed range; subtracting the converted and clipped integers from the high-precision numbers forming high-precision differences; manipulating these converted and clipped integers; and adding the manipulated integers to the high-precision differences to create manipulated high-precision numbers after the processing stage is complete.

It is another aspect of this invention to provide a method for processing transform-coded data in the real domain which reduces the undesired errors in the data produced by the converting to integers and clipping to an allowed range after the inverse transform. In an embodiment, the method includes: performing the inverse quantization of the transform-coded data; performing the inverse transform of the transform data thus produced, such that the real-domain data produced are in the form of high-precision numbers; converting the high-precision numbers to integers and clipping to an allowed range; subtracting the converted and clipped integers from the high-precision numbers forming high-precision differences; manipulating these converted and clipped integers; adding the manipulated integers to the high-precision differences to create manipulated high-precision numbers after the processing stage is complete.

Still another aspect of the present invention is to provide a method for processing transform-coded data in the real domain to produce new transform-coded data, which reduces the error produced by converting to integers and clipping to an allowed range after the inverse transform. In an embodiment, this method includes: performing the inverse quantization of the transform-coded data; performing the inverse transform of the transform data thus produced, such that the real-domain data produced are in the form of high-precision numbers; converting the high-precision numbers to integers and clipping to an allowed range; subtracting the converted and clipped integers from the high-precision numbers forming high-precision differences; processing these converted and clipped integers; adding the processed integers to the high-precision differences to form processed high-precision numbers after the processing stage is complete performing the forward transform on the processed high-precision numbers; and performing quantization on the new transform data. If the errors in the forward and inverse transforms and in the processing are sufficiently small, there will be no undesirable errors produced in the new quantized transform-domain data.

Still another aspect of the present invention is to provide a method for processing the high-precision differences in the real domain to produce new high-precision differences, which reduces the error produced by converting to integers and clipping to an allowed range after the inverse transform. In an embodiment, this method includes: performing the inverse transform of the transform data such that the real-domain data produced are in the form of high-precision numbers; converting the high-precision numbers to integers and clipping to an allowed range; subtracting the converted and clipped integers from the high-precision numbers forming high-precision differences; manipulating these converted and clipped integers; manipulating these high-precision differences; and adding the manipulated integers to the manipulated high-precision differences to create manipulated high-precision numbers after the processing stage is complete.

It is another aspect of this invention to provide a method for processing transform-coded data in the real domain which reduces the undesired errors in the data produced by the converting to integers and clipping to an allowed range after the inverse transform. In an embodiment, the method includes: performing the inverse quantization of the transform-coded data; performing the inverse transform of the transform data thus produced, such that the real-domain data produced are in the form of high-precision numbers;

converting the high-precision numbers to integers and clipping to an allowed range; subtracting the converted and clipped integers from the high-precision numbers forming high-precision differences; manipulating these converted and clipped integers; manipulating these high-precision differences; adding the manipulated integers to the manipulated high-precision differences to create manipulated high-precision numbers after the processing stage is complete.

Still another aspect of the present invention is to provide a method for processing transform-coded data in the real domain to produce new transform-coded data, which reduces the error produced by converting to integers and clipping to an allowed range after the inverse transform. In an embodiment, this method includes: performing the inverse quantization of the transform-coded data; performing the inverse transform of the transform data thus produced, such that the real-domain data produced are in the form of high-precision numbers; converting the high-precision numbers to integers and clipping to an allowed range; subtracting the converted and clipped integers from the high-precision numbers forming high-precision differences; processing these converted and clipped integers; manipulating these high-precision differences; adding the processed integers to the manipulated high-precision differences to form processed high-precision numbers after the processing stage is complete performing the forward transform on the processed high-precision numbers; and performing quantization on the new transform data. If the errors in the forward and inverse transforms and in the processing are sufficiently small, there will be no undesirable errors produced in the new quantized transform-domain data.

Still another aspect of the present invention is to provide a method for selecting between the initial high-precision numbers in the real domain and the processed converted integer data, which reduces the error produced by converting to integers and clipping to an allowed range after the inverse transform. In an embodiment, this method includes: performing the inverse transform of the transform data such that the real-domain data produced are in the form of high-precision numbers; converting the high-precision numbers to integers and clipping to an allowed range; manipulating these converted and clipped integers; and selecting between the manipulated integers and the high-precision numbers to create manipulated high-precision numbers after the processing stage is complete.

Still another aspect of the present invention is to provide a method for selecting between the processed high-precision numbers in the real domain and the processed converted integer data, which reduces the error produced by converting to integers and clipping to an allowed range after the inverse transform. In an embodiment, this method includes: performing the inverse transform of the transform data such that the real-domain data produced are in the form of high-precision numbers; converting the high-precision numbers to integers and clipping to an allowed range; manipulating these converted and clipped integers; manipulating the high-precision numbers to form manipulated high-precision numbers; and selecting between the manipulated integers and the manipulated high-precision numbers to create manipulated high-precision numbers after the processing stage is complete.

There is no requirement that the input data to the methods described herein need come from a single data source. Thus, this invention is not restricted to the real-domain processing of data from a single source, but also applies to real-domain processing of data from multiple sources, such as the merging of images or audio data.

The quantization described in the background is the linear quantization used in international image data compression standards such as JPEG and MPEG. There is no requirement that the quantization be linear. Any mapping that reduces the number of transform data levels in a deterministic way can be used with this invention. The quantization step has been described mathematically with a division in Equation (1). Actual embodiments may use a lookup table or a sequence of comparisons to achieve similar results.

It is a further aspect of the invention to provide apparatus, a computer product and an article of manufacture comprising a computer usable medium having computer readable program code means embodied therein for causing a computer to perform the methods of the present invention.

BRIEF DESCRIPTION OF FIGURES

These and other objects, features, and advantages of the present invention will become apparent upon further consideration of the following detailed description of the invention when read in conjunction with the drawing figures, in which:

FIG. 8(a) gives the JPEG example luminance quantization matrix;

FIG. 8(b) gives the JPEG example chrominance quantization matrix;

FIG. 8(f) and FIG. 8(g) are a numerical example of how real-domain clipping can cause significant errors in 8×8 block DCT coded data;

PROBLEM INTRODUCED BY REPEATED DATA PROCESSING

This invention provides methods, systems, and computer products which reduce or eliminate errors introduced by the processing of digital data. Firstly, the source of the error is analyzed and described. This is followed by a presentation of the invention concepts for error reduction and elimination. It is particularly noted that data manipulation and/or processing as employed here-to-before used digital techniques contaminated by the continued introducing of errors by the respective implementation of digital processing. These techniques employed for years are responsible for an inability to maintain original data precision and the continued deterioration of the data representing the phenomenon as more processing is performed. This is particularly detrimental when a process is performed on data which contain errors imparted on the data by previous processes. This results in the continued impairment of the data which thereby becomes less and less useful as more and more processes are performed thereupon.

The seriousness of the problem as realized by the inventors of the present invention is described forthwith. It is noted that in the figures presented herein, optional steps are often shown with dashed lines and/or boxes.

It is noted that the concepts of the present invention are useful in almost any digital processing technology. However, the subsequent description is mostly related to image data. This is because of the general availability and continued usage of image data compression standards which are employed worldwide. These standards require the introduction into the digital data of the errors to be described and the continued employment and processing of the error contaminated data. These standards basically teach away from the present invention. Thus image technology is a good example for describing the present invention.

Figure 1A:
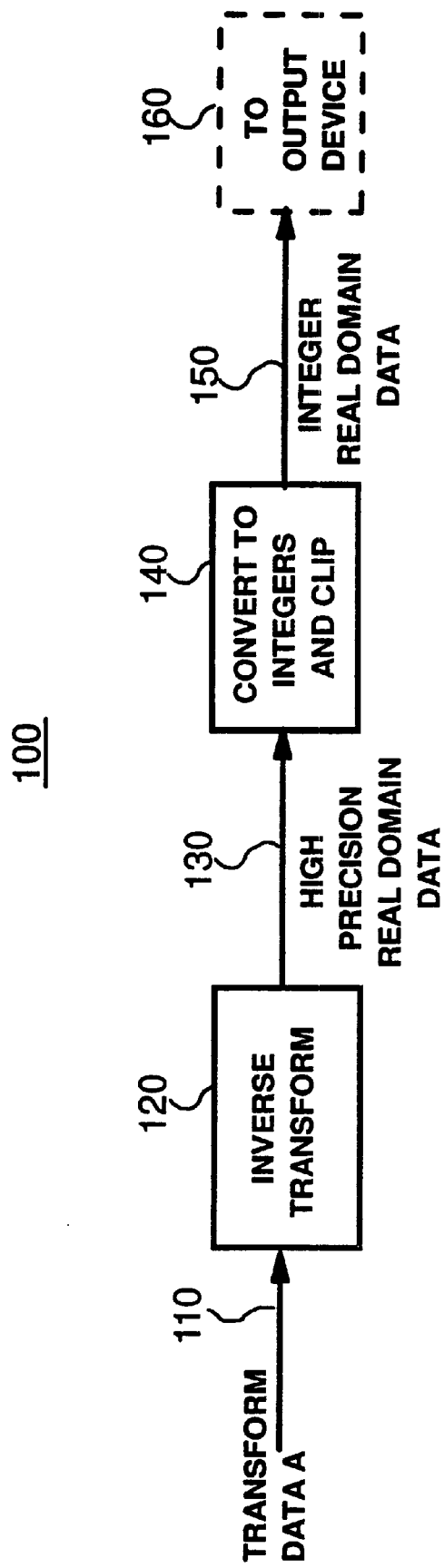
FIG. 1(a) is a block diagram showing a method for performing an inverse transform.

FIG. 1(a) shows an inverse transform method 100. Transform-domain data 'A' 110 are acted on by the inverse transform 120, which produces high-precision real-valued data 130. The high-precision data 130 are converted to integers and clipped 140 to produce integer real-domain data 150. In some cases, the integer-valued data are optionally sent to an output device 160.

Figure 1B:
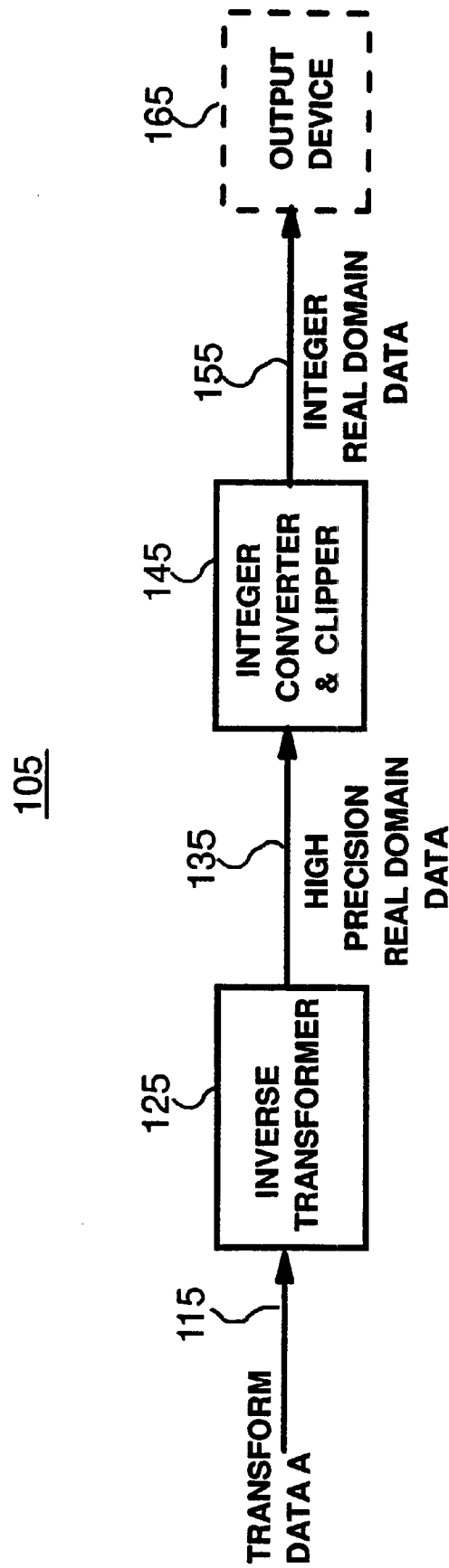
FIG. 1(b) is a block diagram showing a system for performing an inverse transform.

FIG. 1(b) shows an inverse transform system 105. Transform-domain data 'A' 115 are acted on by the inverse transformer 125, which produces high-precision real-valued data 135. The high-precision data 135 are input to the integer converter and clipper 145 to produce integer real-domain data 155. In some cases, the integer-valued data are optionally input to an output device 165 such as a display monitor, a television set, or an audio player.

Figure 2A:
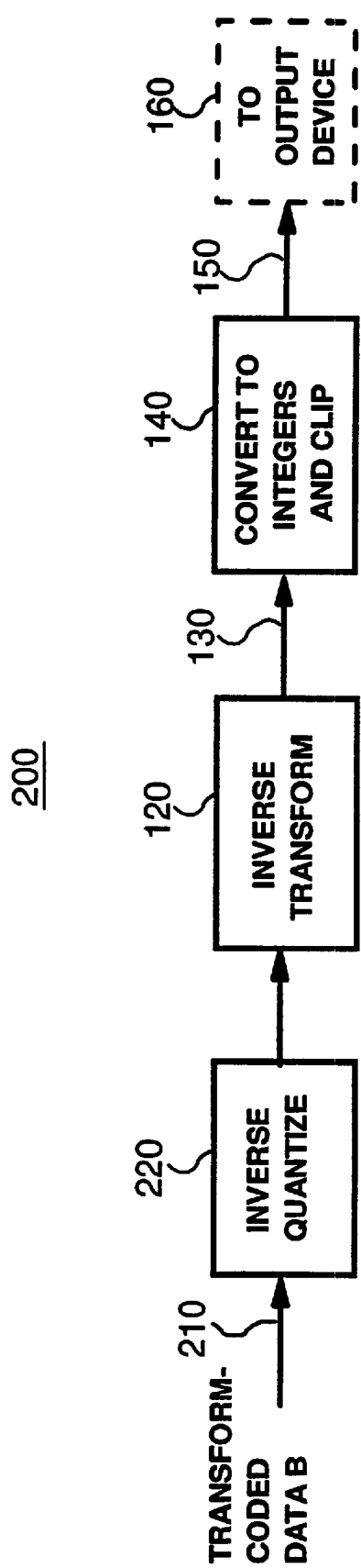
FIG. 2(a) is a block diagram showing a method for decoding transform-coded data.

FIG. 2(a) shows a method 200 for decoding transform-coded (i.e. quantized) data. The integer transform-coded data 'B' 210 are inverse quantized 220 with quantization values as in Equation (2) above. The result of the dequantizing step may then be passed as input to the inverse transform 120, and decoding proceeds as in FIG. 1(a).

Figure 2B:
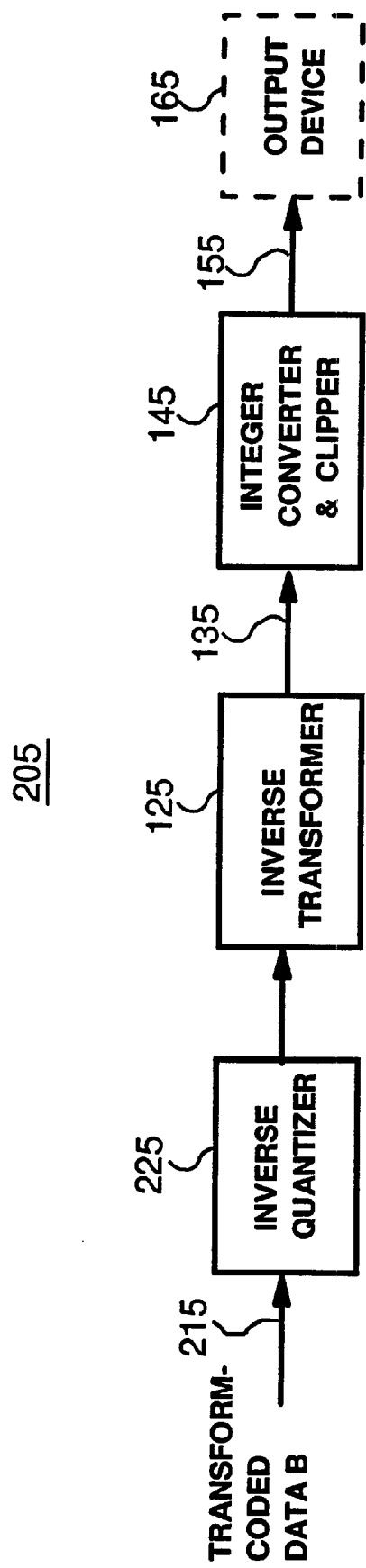
FIG. 2(b) is a block diagram showing a system for decoding transform-coded data.

FIG. 2(b) shows a system 205 for decoding transform-coded (i.e. quantized) data. The integer transform-coded data 'B' 215 are input to the inverse quantizer 225 with quantization values as in Equation (2) above. The result of the dequantizing step is passed as input to the inverse transformer 125, and decoding proceeds as in FIG. 1(b).

One aspect of the present invention is concerned with the manipulation of both transform data and transform-coded data. The words "manipulation" and "processing" are used interchangeably herein. Manipulation may be employed in order to achieve many different results. For example, image data must often be processed before printing by scaling and/or rotation. Data from two sources can be merged as is performed in chroma-keying of images or mixing of audio data. Manual manipulation of data is often needed for editing or color correction. Such manipulation of transform data are often performed on the integer real-domain data which results from the transform decoding of FIG. 1(a) and/or FIG. 2(a).

Figure 3:
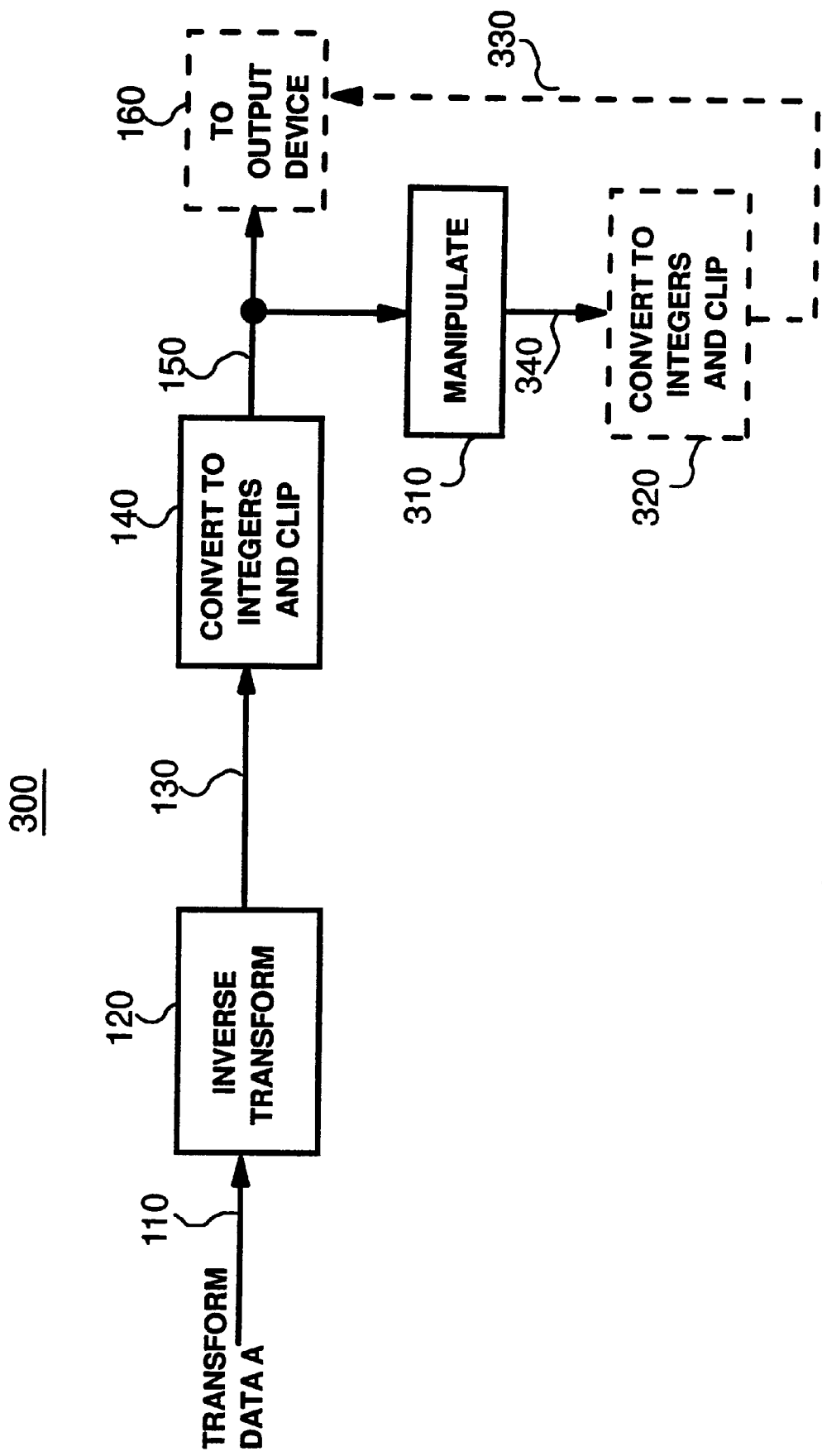
FIG. 3 is a block diagram showing a method for the real-domain processing of transform data.

A process for manipulation of transform data 300 is shown in FIG. 3. Integer data 150 undergo some form of manipulation 310. If this manipulation 310 does not produce integer output, the manipulated output 340 is again converted to integers and clipped 320. The resulting integer data 330 may be stored, transmitted, and/or optionally sent to an output device 160. Because the stage of clipping and converting to integers 140 is performed before the manipulation which accepts integer input 150, the resulting errors cause the data output from the manipulation 340 to contain at least small inaccuracies.

It is noted that there is no requirement in the data manipulation processes described above, for the input data to come entirely from one source. For example, many types of data manipulation involve the merging of data from two or more sources. This includes manipulations such as mixing of audio data or merging of images. The processes illustrated in the figures and described generally apply equally well to such types of manipulation. Thus the "input data" used for any of the processes described may in practice come from more than one input source.

Figure 4:
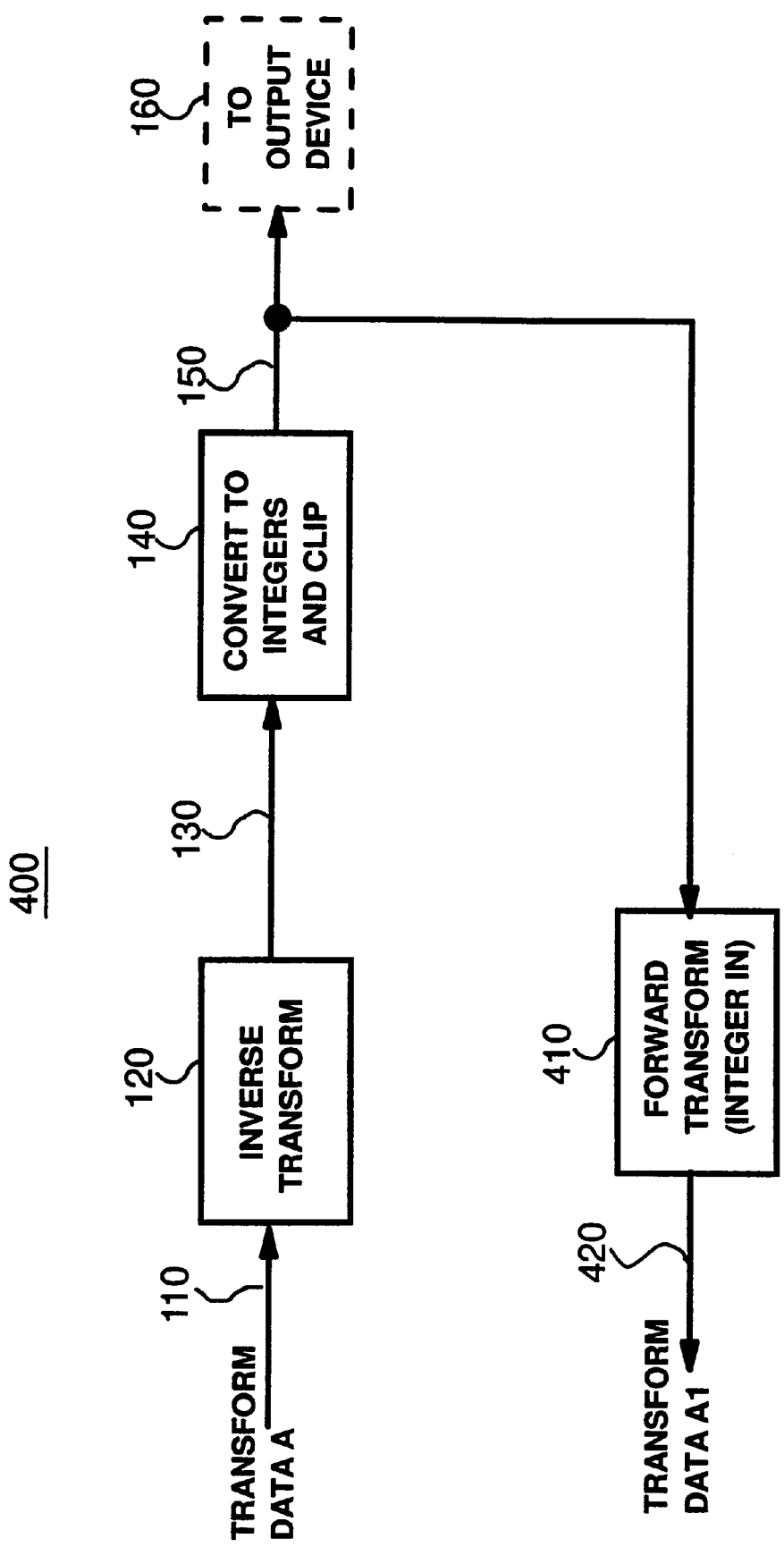
FIG. 4 is a block diagram showing a method for performing an inverse transform followed by a forward transform, and demonstrating the multi-generation problem.

It is often the case that data after manipulation are to be re-encoded to the transform domain. It is desirable that the process of decoding and re-encoding, when no manipulation is performed on the real-domain data, should be lossless. That is, the data, when the forward transform operation uses the same transform type operation as the inverse transform type of transform operation, should result in exactly the same transform-domain data as was present initially. However, errors are introduced by the converting to integers and clipping to the allowed range as is illustrated in FIG. 4. FIG. 4 shows the integer data 150 used as input to the forward transform device 410, which accepts integer-valued data as input. The resulting transform data 'A1' 420 are different from the original transform data 'A' 110 which were the input to the inverse transform. This is because the conversion to integers and the clipping process 140 have introduced errors into the process. The problem caused by the changes in data after each iteration, or "generation", of this process is herein called the "multi-generation problem".

Figure 5:
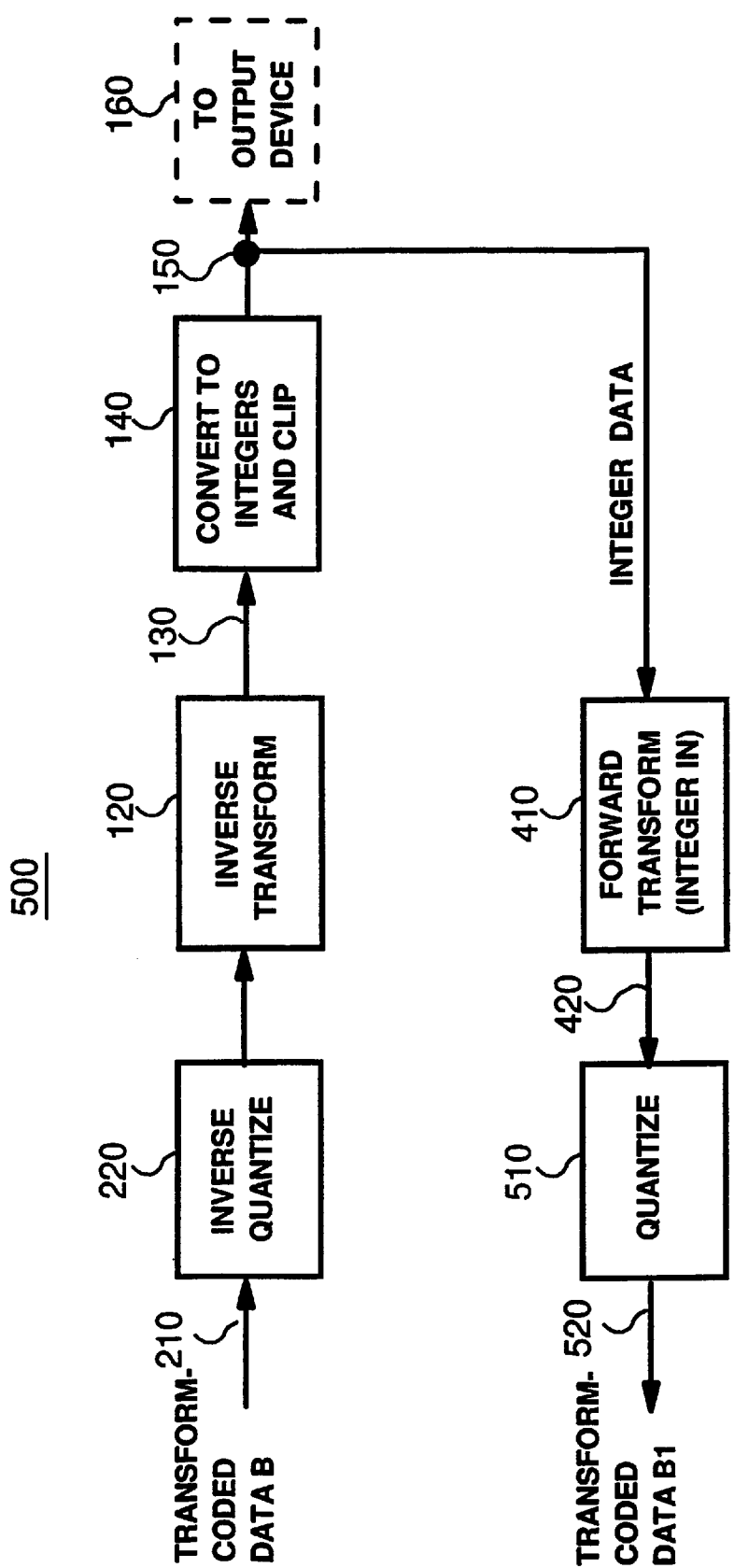
FIG. 5 is a block diagram showing a method for decoding and re-encoding transform-coded data, and demonstrating the multi-generation problem.

The multi-generation problem is also illustrated for transform-coded data in FIG. 5. Here the new transform-domain data 420 are quantized 510 to produce new transform-coded data 'B1' 520. It is important to realize that the quantized data can only change if the errors produced are larger than half a quantization step:

$$Q(\lambda_i+\epsilon)=Q(\lambda_i) \text{ if } |\epsilon|<0.5q_i \tag{3}$$

where $\epsilon$ is the error produced in this transform coefficient. This is because each of the $\lambda_i$ is already a multiple of the quantization value, since they have been produced by dequantization as in Equation (2). Thus it is advantageous to control the errors so that they are sufficiently small. When the errors are sufficiently small, the new transform-coded data will be exactly the same as the original transform-coded data. The maximum possible error introduced by the conversion to integers by rounding is half the error introduced by truncating during the conversion.

Figure 6:
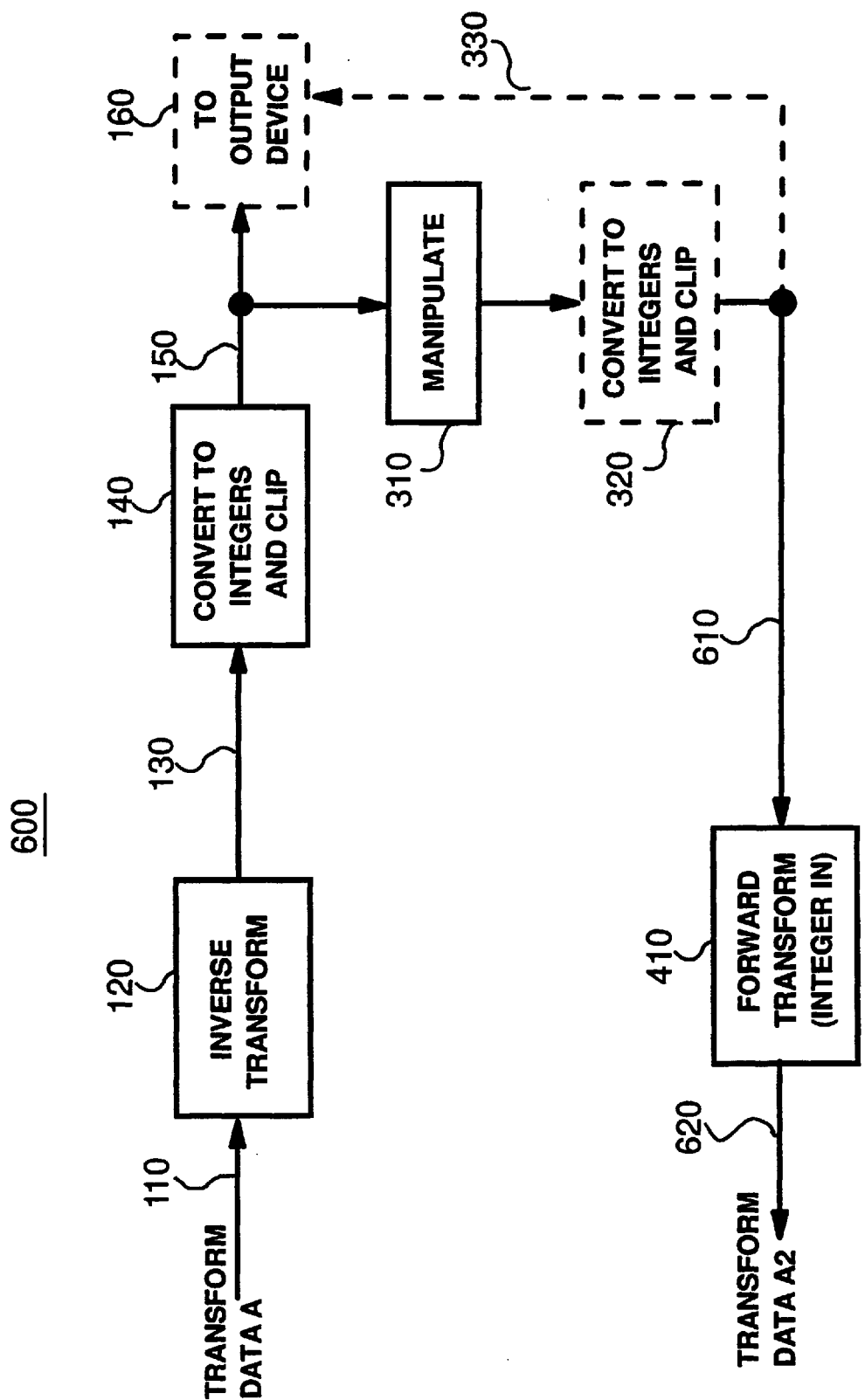
FIG. 6 is a block diagram showing a method for performing an inverse transform, real-domain data manipulation and a forward transform, and demonstrating the multi-generation problem.

FIG. 6 shows a case wherein image manipulation is performed on the data and the resulting modified data are then re-transformed back to the transform domain. The integer data 150 are manipulated as was shown in FIG. 3 to produce new integer-valued data 610. These new integer-valued data 610 are used as the input to the forward transform 410 to produce new transform data 'A2' 620. The fact that the process described above without any manipulation produces changes in the transform data 110 shows that when manipulation is performed there are undesired changes in the transform data 110 in addition to those which result from the desired manipulation.

Figure 7A:
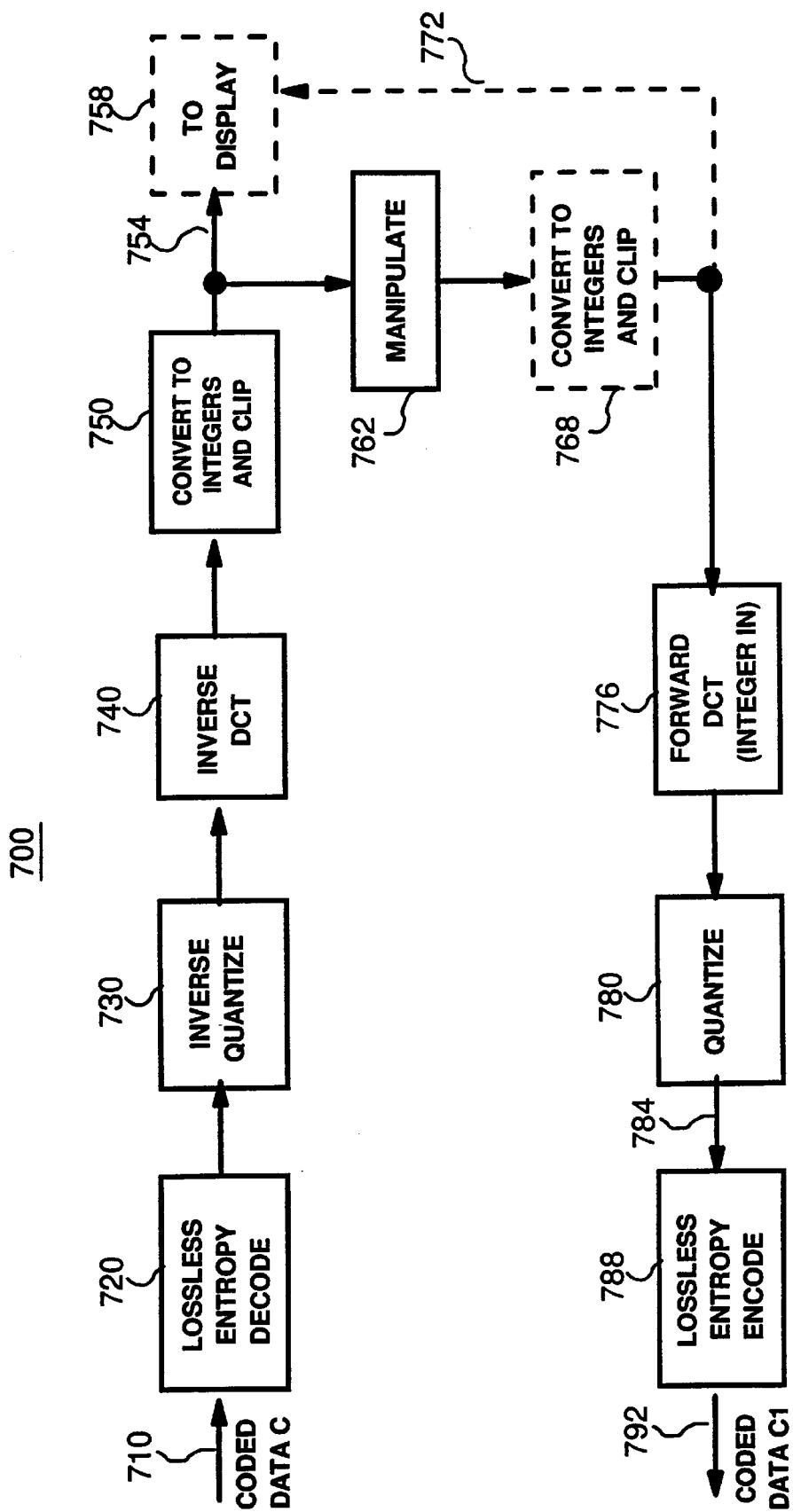
FIG. 7(a) is a block diagram showing a method for performing real-domain processing of JPEG DCT-coded image data, which exhibits the multi-generation problem.

An example of a method which embodies the process shown in FIG. 6, is shown in FIG. 7(a). The method 700 illustrated performs real-domain manipulation on coded data such as JPEG-coded image data. The coded data 'C' 710 are entropy decoded 720, which is defined for JPEG-coded data in the JPEG standard. The entropy decode step 720 decompresses the data into quantized DCT coefficients. These quantized coefficients are inverse quantized 730 and passed to the inverse transform, which in this system is the two-dimensional 8×8 inverse DCT 740. The resulting real-valued image data are rounded to integers and clipped 750 to the allowed range (e.g.[0,255]) to produce integer-valued image data 754 in the allowed range.

If it is necessary to show the data before manipulation, for example when the image manipulation is an interactive process, the image can optionally be sent to a display device 758. The image is then manipulated 762 to produce some desired change. If the result of the manipulation is non-integer data then the image data may be converted to integers and clipped to the range e.g. [0,255] 768. In this way the image data 772 may again be displayed 758. The new real-domain image data 772 are passed to the forward DCT 776 and the resulting DCT coefficients are quantized 780 to produce new quantized DCT coefficients 784. These coefficients 784 are then entropy encoded 788 to produce new coded data 'C1' 792 which are different from the original coded data 'C' 710. Now the new coded data 'C1' 792 incorporates not only the desired changes made to the image by the image manipulation 762, but also the errors resulting from the converting and clipping stages 750 and 768. It would be advantageous to eliminate or reduce these errors.

Figure 7B:
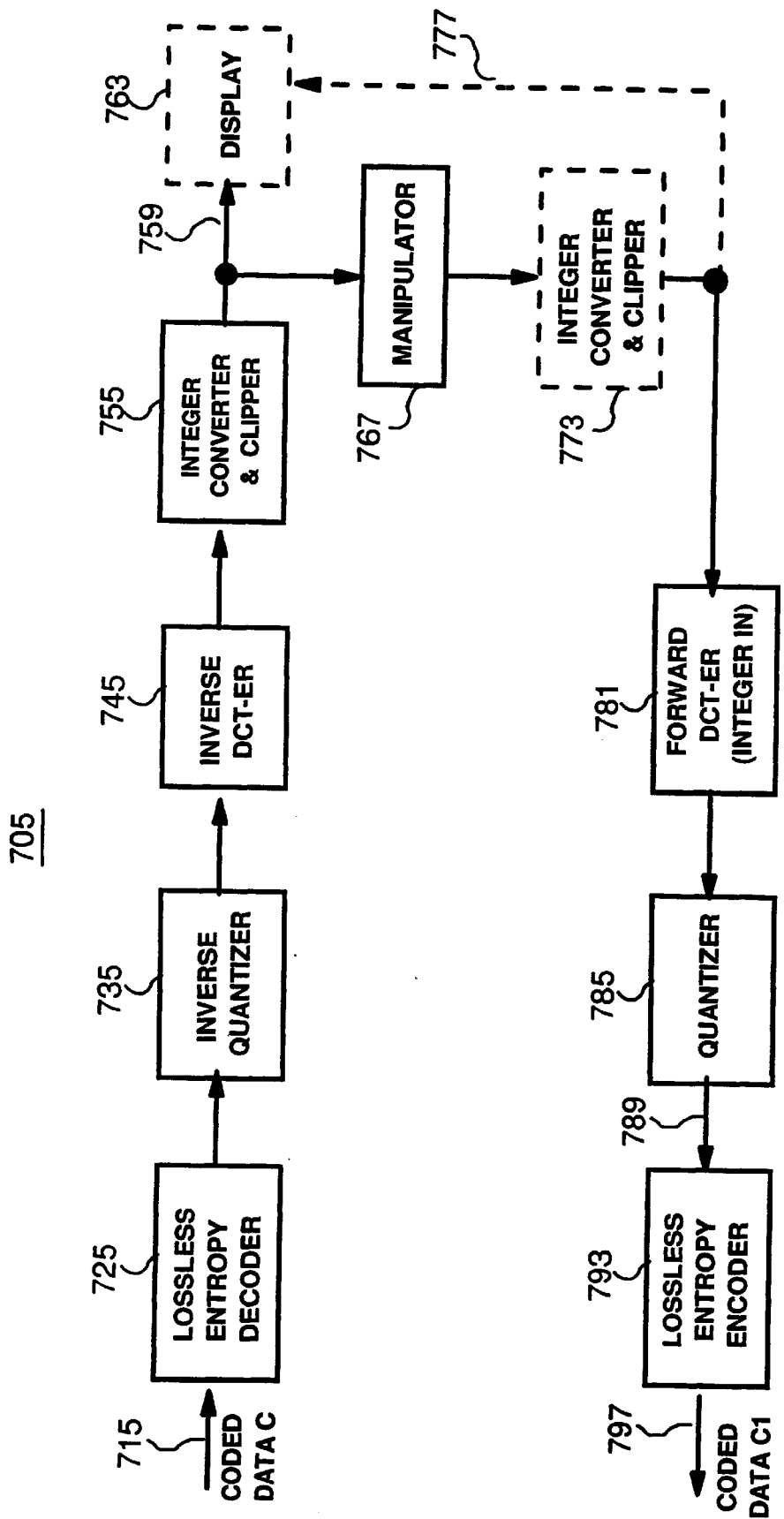
FIG. 7(b) is a block diagram showing a system for performing real-domain processing of JPEG DCT-coded image data, which exhibits the multi-generation problem.

An example of a system which embodies the process shown in FIG. 6, is shown in FIG. 7(b). The system 705 performs real-domain manipulation on coded data. The coded data 'C' 715 are input to the entropy decoder 725, which is defined for JPEG-coded data in the JPEG standard. The entropy decoder 725 decompresses the data into quantized DCT coefficients. These quantized coefficients are input to the inverse quantizer 735 and the output passed to the inverse transformer, which in this system is the two-dimensional 8×8 inverse DCT-er 745. The resulting real-valued image data are rounded to integers and clipped 755 (e.g. to the range [0,255]) to produce integer-valued image data 759 in the allowed range.

If it is necessary to show the data before manipulation, for example when the image manipulation is an interactive process, the image can optionally be sent to a display 763. The image is operated on by a manipulator 767 to produce some desired change. If the result of the manipulation is non-integer data then the image data may be passed to another integer converter and clipper 773. In this way the image data 777 may again be displayed 763. The new real-domain image data 777 are passed to the forward DCT-er 781 and the resulting DCT coefficients are input to the quantizer 785 to produce new quantized DCT coefficients 789. These coefficients 789 are then input to the entropy encoder 793 to produce new coded data 'C1' 797 which are different from the original coded data 'C' 715. Now the new coded data 'C1' 797 incorporates not only the desired changes made to the image by the image manipulator 767, but also the errors resulting from the integer converter and clippers 755 and 773.

FIG. 8(*a*) shows the JPEG example luminance quantization matrix 804 for 8×8 DCT luminance blocks. FIG. 8(*b*) gives the JPEG example chrominance quantization matrix 814 for 8×8 DCT chrominance blocks. The smallest quantization value in FIG. 8(*a*) is 10. The smallest quantization value in FIG. 8(*b*) is 17.

Since the maximum possible error from rounding is 0.5 for each of 64 samples, the largest error in the unquantized forward transform coefficients from conversion to integers by rounding is 4 (shown in FIG. 8(*c*)). For the quantization matrices shown in FIGS. 8(*a*) and 8(*b*) this size error is less than half of all of the values and will disappear during quantization. However, for high quantity applications such as high end printing or digital studio editing, the quantization matrix values are much smaller. In some cases, the DC (upper left corner) term is as small as 1 to preserve maximum quality. Then the rounding errors are significant.

The maximum possible error from truncating is just under 1 for each sample. This almost doubles the error in the unquantized forward transform coefficients. For the quantization matrix in FIG. 8(*a*) eight quantization values are small enough for this error to potentially change the transform-coded data.

A numerical example showing the multi-generation problem is given in FIG. 8(*c*). In this example the transform used is the 8×8 DCT as used in the JPEG still image compression standard. A set of transform-domain coefficients 822, of which only one (the constant, or DC, term) is non-zero, are operated on by the inverse transform to produce an block of real-domain data 824. In this case the data consist of 64 values which are all equal to 128.5. Note that the JPEG level shift of 128 for 8 bit data has been applied. The real-domain data are rounded to the nearest integers 826, which in this case means that each value is rounded up to 129. The forward transform is then applied to produce new transform-domain coefficients 828. It can be seen that the resulting new transform coefficients 828 are significantly different from the initial transform coefficients 822. This is a highly undesirable result.

This example also applies to transform-coded data if the DC quantization value is set to 1, 2, or 4. Then the transform coefficients 822 would be produced from transform-coded values of 4, 2, or 1 respectively. The quantization of the new transform coefficients 828 would change the resulting DC quantization values to 2, 4, or 8 respectively.

Another numerical example showing the multi-generation problem is given in FIG. 8(*d*). Again the transform used is the 8×8 DCT as used in the JPEG still image compression standard. A set of transform-domain coefficients 832, of which only one (the constant, or DC, term) is non-zero, are operated on by the inverse transform to produce a block of real-domain data 834. In this case the data consist of 64 values which are all equal to 128.875. Note that the JPEG level shift of 128 for 8 bit data has been applied. The real-domain data are truncated to the nearest integers 836, which in this case means that each value is reduced to 128. The forward transform is then applied to produce new transform-domain coefficients 838. It can be seen that the resulting new transform coefficients 838 are significantly different from the initial transform coefficients 832. This is a highly undesirable result.

Having demonstrated the errors caused by real-domain rounding or truncating when converting to integers, we now show how real-domain clipping can cause errors. FIG. 8(*e*) shows an example of real-domain clipping 850. This example uses the one-dimensional DCT to illustrate the problem. FIG. 8(*d*) shows a bar chart 854 displaying one block of data consisting of eight samples. The data displayed has only two frequency components: a constant, or DC, component which is indicated by the dotted line; and an alternating, or AC, component which gives an alternating wave pattern symmetrical about the dotted line. The magnitudes of these components, namely the respective DCT coefficients, are high-precision numbers. When quantization is performed, these DCT coefficients are rounded to the nearest quantization level. The data after transform-domain quantization are shown in the bar chart 858. In the example shown, the DC coefficient has a small quantization value and so quantization does not change the DC level significantly. The AC coefficient shown has a large quantization value and so is changed significantly by quantization. This example shows the AC component almost doubling in magnitude due to quantization. These quantization values reflect, for example, those used when compressing chrominance image data. Thus the data represented after quantization have parts which have negative values. This shows how transform-domain data which, after inverse transforming, give real-domain negative values can be produced by original real-domain data which do not contain negative values.

Bar chart 862 shows the data produced from that in chart 858 after real-domain clipping. Those negative parts of the real data have been changed to 0. This results in the DC coefficient of the data increasing and hence leads to error being introduced. Because the quantization value for the DC coefficient is generally small, the error is large enough to cause a change in the quantized data as given in Equation (3).

To further illustrate the possibility of error introduced by real-domain clipping, a numerical example 870 is shown in FIGS. 8(*f*) and 8(*g*). This example employs the system illustrated in FIG. 5. This example uses the two-dimensional 8×8 DCT as used for transform coding of images to illustrate the problem described above. The initial quantized DCT coefficients are shown in matrix 874. All but two of the coefficients are 0; the two non-zero coefficients are the DC coefficient and one high-frequency coefficient. The coefficients, after dequantizing using the quantization matrix shown in FIG. 8(a), are shown in matrix 878. When the inverse DCT is performed on these transform data and the level shift of 128 added, real data are produced as shown in matrix 882. The data shown in matrix 882 have already been rounded to integers but have not been clipped to an allowed range. It can be seen that these real data include several negative values. After clipping, the real data 882 produce clipped real data as shown in matrix 886. These data are identical to 882 except that each negative value has been replaced by 0. The forward DCT is then applied to the real-domain data to give new rounded transform data 890. It can be seen that the new transform data are significantly different from the previous transform data 878. When quantization is performed using the quantization matrix shown in FIG. 8(a), new transform-coded data 894 are produced. The resulting changes in the transform data are large enough to produce changes in the transform-coded data after quantization. This is a highly undesirable result.

In many situations, the process of decoding, manipulation and re-encoding of data needs to be done multiple times. In these situations each iteration of this process is referred to as a "generation". The errors described above, caused by converting to integers and clipping to an allowed range in the real domain, accumulate as multiple iterations are performed and may result in significant degradation of the data. It is realized that the foregoing are only representative examples of errors introduced by rounding (or truncating) and/or clipping. Other examples having more or less error developed are possible.

Figure 9:
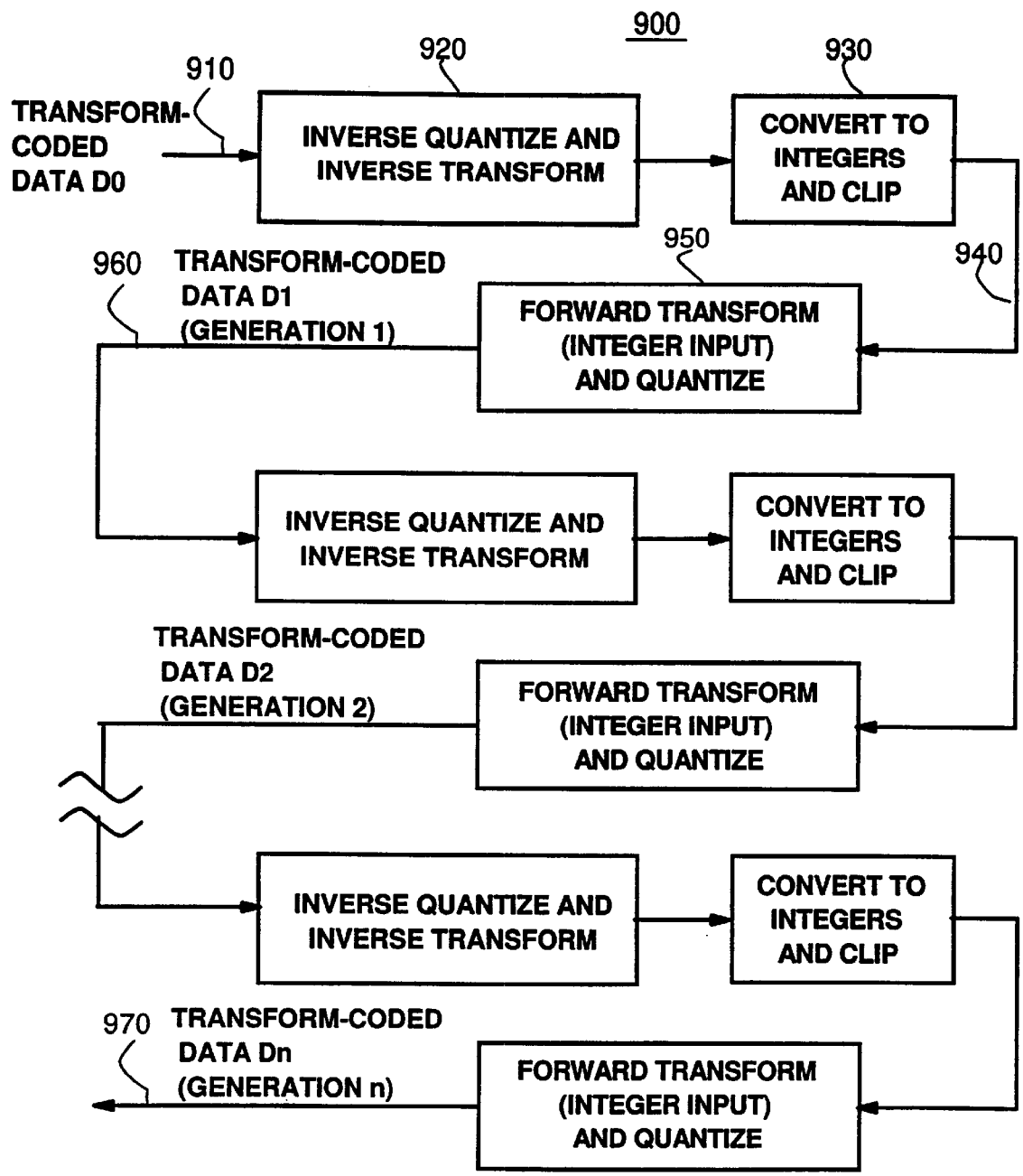
FIG. 9 is a block diagram showing a method performing multiple iterations of the process described in FIG. 5, and exhibiting the multi-generation problem.

The problem is usually even worse following multiple generations of decoding and re-encoding as shown in FIG. 9. Initial transform-coded data 'D0' 910 is dequantized and inverse transformed 920, converted to integers and clipped to an allowed range 930 to produce integer-valued real-domain data 940. The real-domain data 940 are passed to the forward transform and quantized 950 to give new transform-coded data 'D1' 960. This whole process is iterated several times, and after some number 'n' of iterations the final transform-coded data 'Dn' 970 is produced. Because of errors in each step the final data 'Dn' 970 may be very different from the original data.

Figure 10:
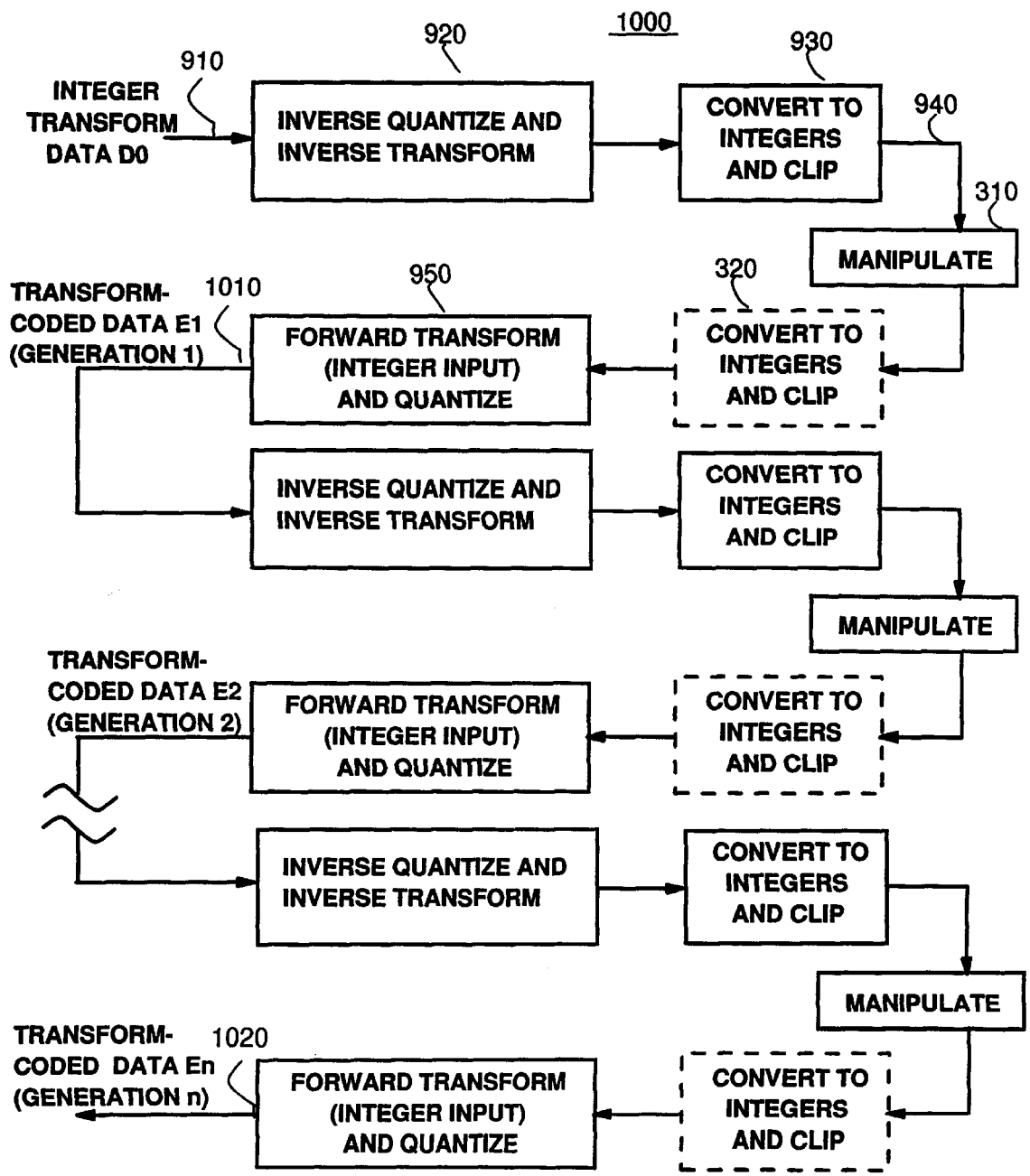
FIG. 10 is a block diagram showing a method for performing multiple iterations of real-domain manipulations, and exhibiting the multi-generation problem.

A case showing the problem significantly worsened due to multiple generations of real-domain manipulation of transform-coded data is shown in FIG. 10. In addition to the steps shown in FIG. 9, some form of manipulation 310 is performed on the real-domain data, followed by converting to integers and clipping 320. After the forward transform and quantization, the resulting quantized transform coefficients 1010 contain some error as in FIG. 5. After 'n' generations, the final transform quantized coefficients 1020 may have quite large undesired errors.

DETAILED DESCRIPTION OF THE INVENTION

Figure 11A:
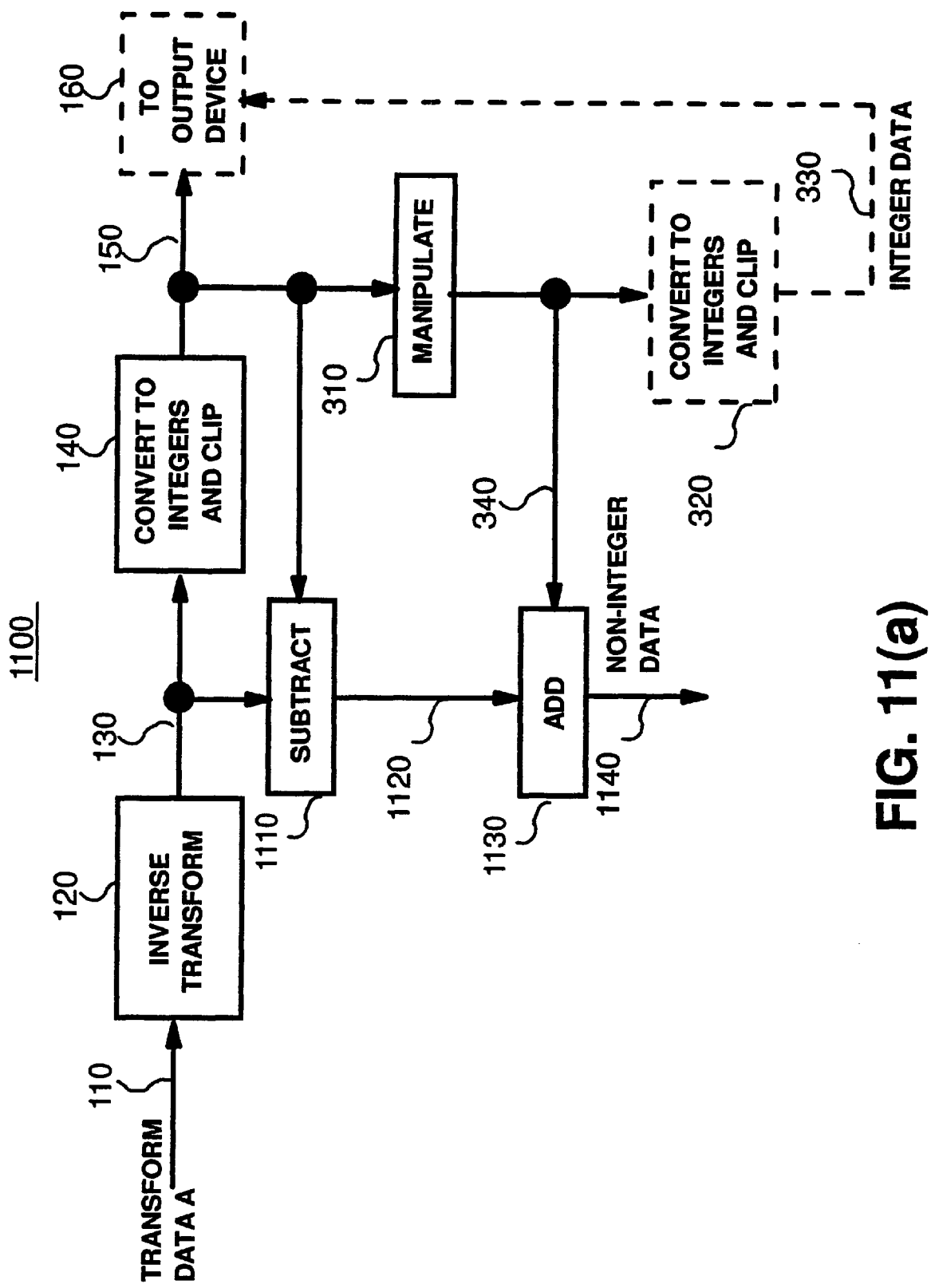
FIG. 11(a) is a block diagram showing an example of a method for reduced-error processing of transform data in accordance with the present invention.

An example embodiment of a method for processing transform data with reduced error 1100 is illustrated in FIG. 11(a). Transform data 'A' 110 are passed through an inverse transform 120 to produce high-precision real-domain data 130, as in FIG. 1(a). The high-precision data 130 are converted to integers and clipped 140 to produce integer real-domain data (i.e. converted data) 150. In some cases, the integer-valued data are optionally sent to an output device 160. Integer data 150 undergo some form of manipulation 310. If this manipulation 310 does not produce integer output, the manipulated output 340 is again converted to integers and clipped 320. The resulting integer data 330 may be stored, transmitted, and/or optionally sent to an output device 160.

Because the stage of clipping and converting to integers 140 is performed before the manipulation which accepts integer input 150, the resulting errors cause the data output from the manipulation 340 to contain at least small inaccuracies. The inaccuracies can be removed by subtracting 1110 the converted data 150 from the high-precision numbers 130, forming high-precision differences 1120. These differences 1120 may be added 1130 back to the manipulated output 340 to form manipulated high-precision numbers 1140 in which the errors from clipping and converting to integers are reduced or removed.

In some embodiments of the present invention, the adding step 1130 is implemented as an intelligent addition. These embodiments recognize that high-precision differences having magnitudes greater than 0.5 for rounding and/or 1.0 for truncating provide an indication that the data have been clipped. Thus, when the processed converted data corresponding to clipped data no longer has an extreme value for the allowed range, then the adding step intelligently keeps only the processed converted data. In this case, the intelligent addition does not add the high-precision difference to the converted data. In an alternate embodiment of intelligent addition, the adding step, a threshold is defined for tolerable error that does not impact future uses for the processed high-precision numbers. aIn this alternate adding embodiment, only errors of larger magnitude than the defined threshold are added to the processed converted data. Other alternate intelligent addition implementation rules are also sometimes used. All these alternate special addition implementations are herein referred to as adding intelligently. Thus for these embodiments, whenever an adding step is indicated herein, it is implemented as an intelligent addition.

The above embodiment has the advantage that the traditional manipulating (i.e. processing) is undisturbed. The high-precision differences are created before the manipulation step, and then added back into the processed data after the traditional processing. The clipping step generates converted data at an extreme of the range. If the processed converted data are no longer at an extreme, then the intelligent adding step may take the converted data without adding back in differences with magnitudes greater than 0.5 for rounding and 1 for truncating.

Figure 11B:
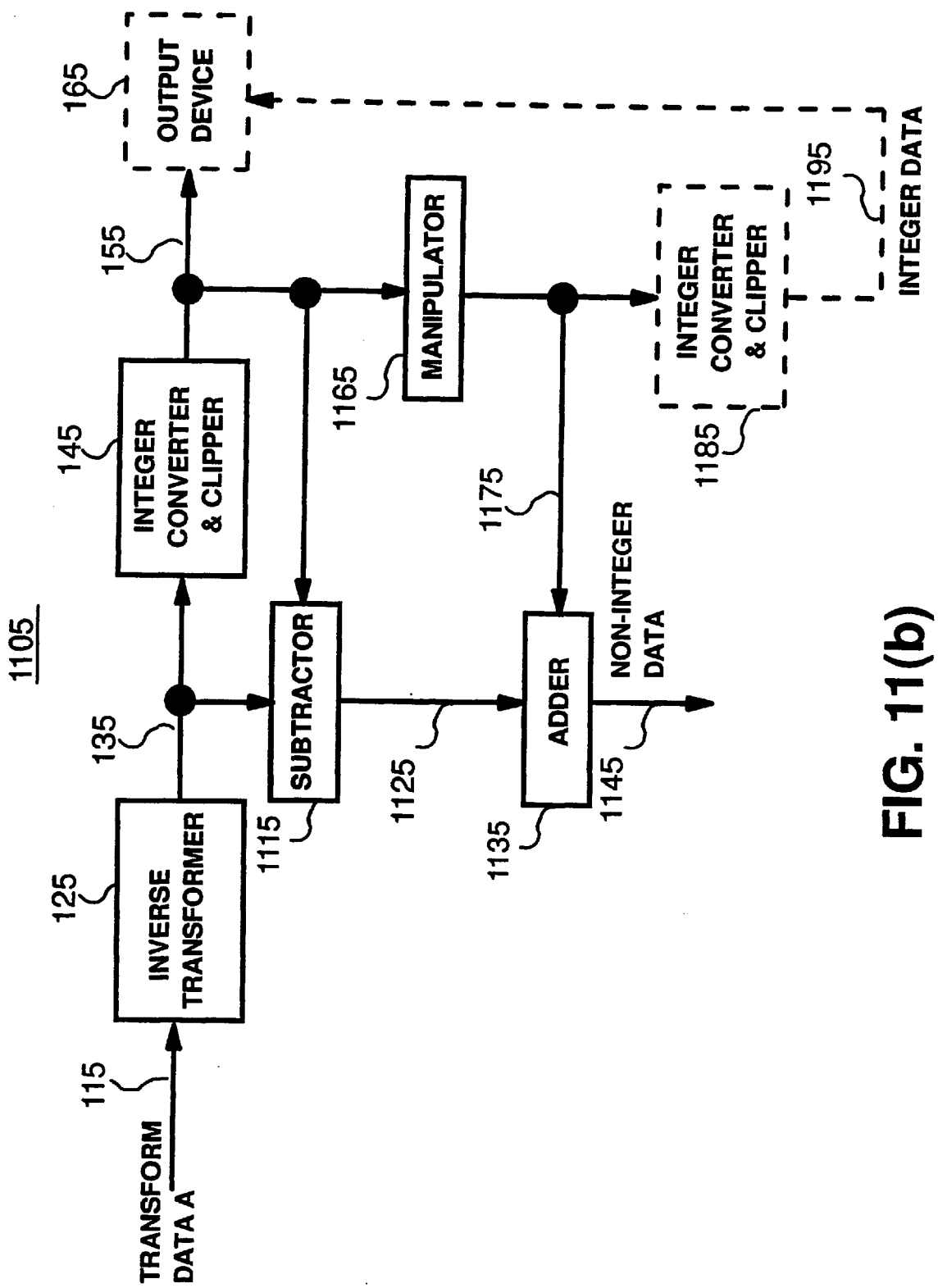
FIG. 11(b) is a block diagram showing an example of a system for reduced-error processing of transform data in accordance with the present invention.

An example embodiment of a system for processing transform data with reduced error 1105 in accordance with the present invention is illustrated in FIG. 11(b). Transform data 'A' 115 are passed through an inverse transformer 125 to produce high-precision real-domain data 135, as in FIG. 1(b). The integer converter and clipper 145 operates on the high-precision data 135 to produce integer real-domain data 155. In some cases, the integer-valued data are optionally sent to an output device 165. The manipulator 1115 operates on the real-domain converted data 155 accepting integer data as input and producing either integer data or high-precision data 1175 as output. This manipulator 1115 performs the same processing on the data as the manipulation on integers 310 described above in FIG. 3. After the manipulation, the adder 1135 adds the manipulated data 1175 to the high-precision differences 1125 to form manipulated high-precision numbers 1145. If it is necessary to pass the manipulated real-domain data to an output device 165 which takes integer-valued input, the integer converter and clipper 1185 operates after manipulation to guarantee integer data 1195.

In some embodiments of the present invention, the adder 1135 is implemented as an intelligent adder. These embodiments recognize that high-precision differences having magnitudes greater than 0.5 for rounding and/or 1.0 for truncating provide an indication that the data have been clipped. Thus, when the processed converted data corresponding to clipped data no longer has an extreme value for the allowed range, then the adding step intelligently keeps only the processed converted data. In this case, the intelligent adder does not add the high-precision difference to the converted data. In an alternate embodiment of the intelligent adder, a threshold is defined for tolerable error that does not impact future uses for the processed high-precision numbers. In this alternate adder embodiment, only errors of larger magnitude than the defined threshold are added to the processed converted data. Other alternate intelligent adder implementation rules are also sometimes used. All these alternate special adder implementations are herein referred to as intelligent adders. Thus for these embodiments, whenever an adder is used herein, it is implemented as an intelligent adder.

Figure 12A:
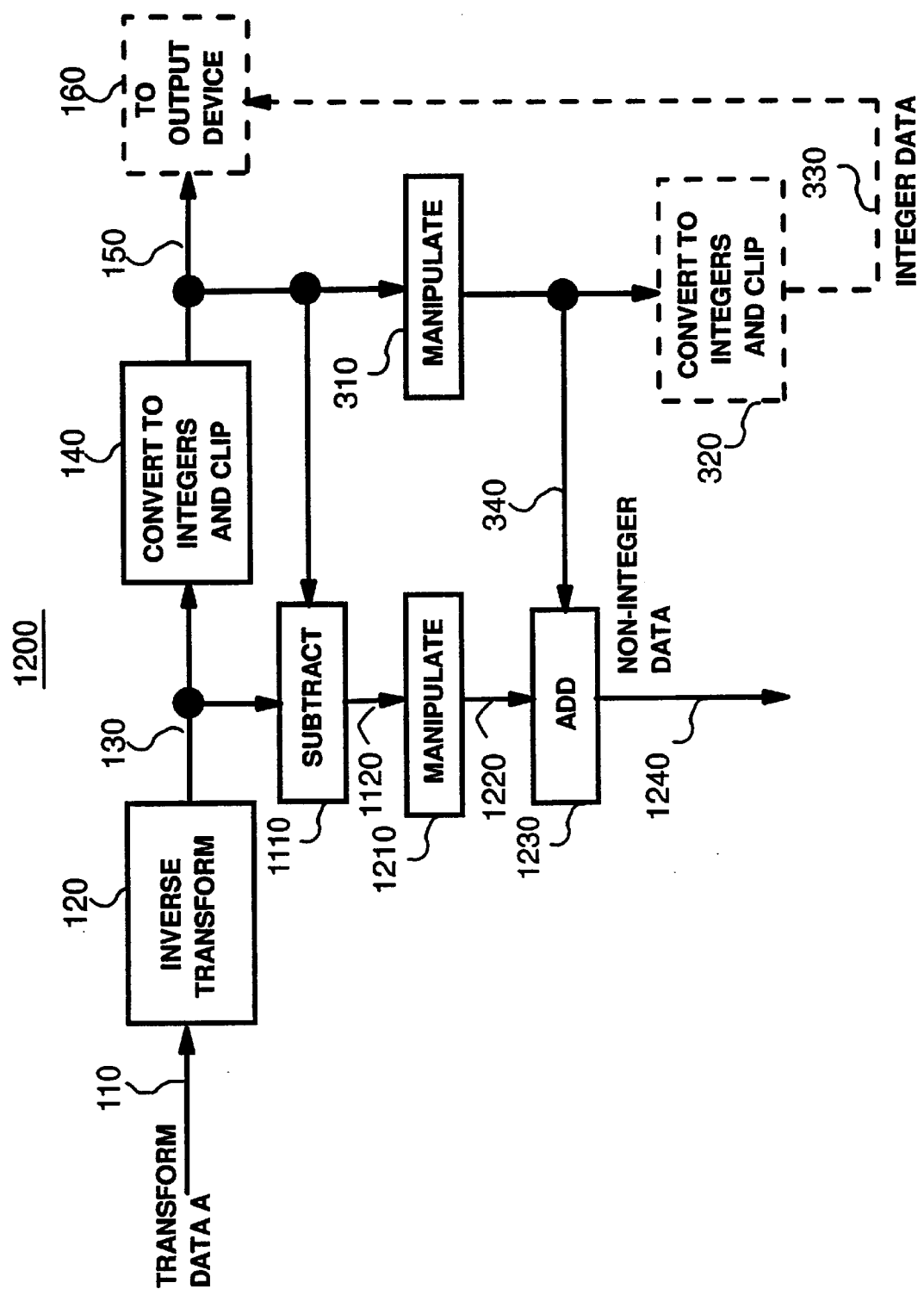
FIG. 12(a) is a block diagram showing an example of a method for reduced-error processing of transform data including processing of the high-precision differences in accordance with the present invention.

FIG. 12(a) shows a method for performing real-domain manipulation of transform data with reduced error 1200. This method is formed by extending the method 1100 described in FIG. 11(a). In this embodiment, the high-precision differences 1120 are passed to a manipulation step 1210 which accepts high-precision difference data as input, to produce new manipulated high-precision differences 1220. The adding step 1230 uses the manipulated high-precision differences 1220 to add back into the output from the traditional manipulating step 310 forming processed high-precision output 1240.

For example, in an embodiment wherein the manipulating step 310 performs a 90 degree rotation on the converted data, then the high-precision differences also are rotated by 90 degrees. If the manipulating step 310 merges two data sets, such as by the chroma-keying method, then the high-precision differences need to be merged to correspond to the manipulated converted data. For some manipulations such as color correction of the converted data, the corresponding difference data may be cleared or zeroed since the differences no longer correspond to the changed converted data.

Figure 12B:
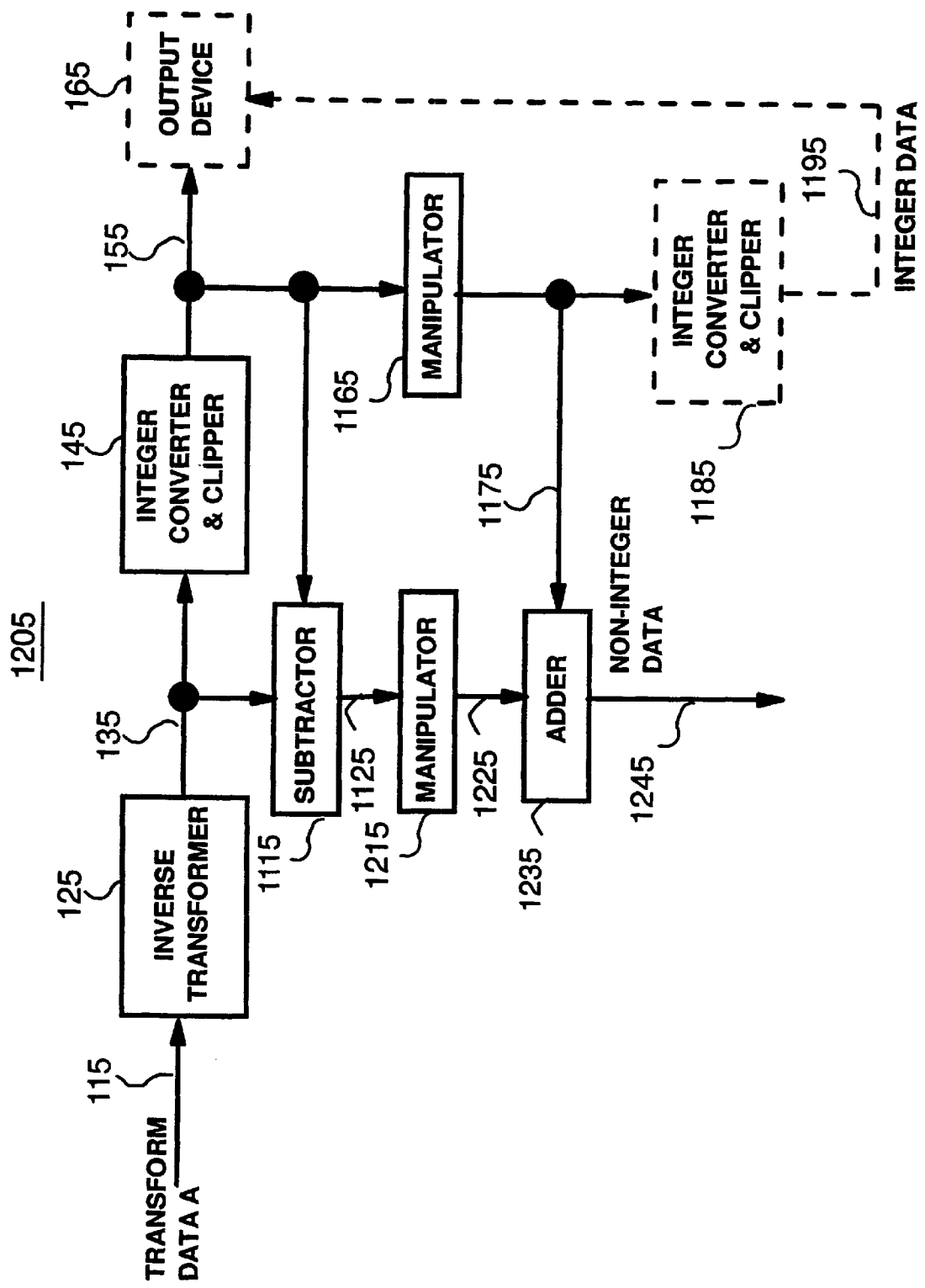
FIG. 12(b) is a block diagram showing an example of a system for reduced-error processing of transform data including processing of the high-precision differences in accordance with the present invention.

FIG. 12(b) shows a system for performing real-domain manipulation of transform data with reduced error 1205. This system is formed by modifying the system 1105 described in FIG. 11(b). In this embodiment, the high-precision differences 1125 are passed to a manipulator 1215 which accepts high-precision difference data as input, to produce new manipulated high-precision differences 1225. The adder 1235 uses the manipulated high-precision differences 1225 to add back into the output from the traditional manipulator 1165 forming processed high-precision output 1245.

Figure 13A:
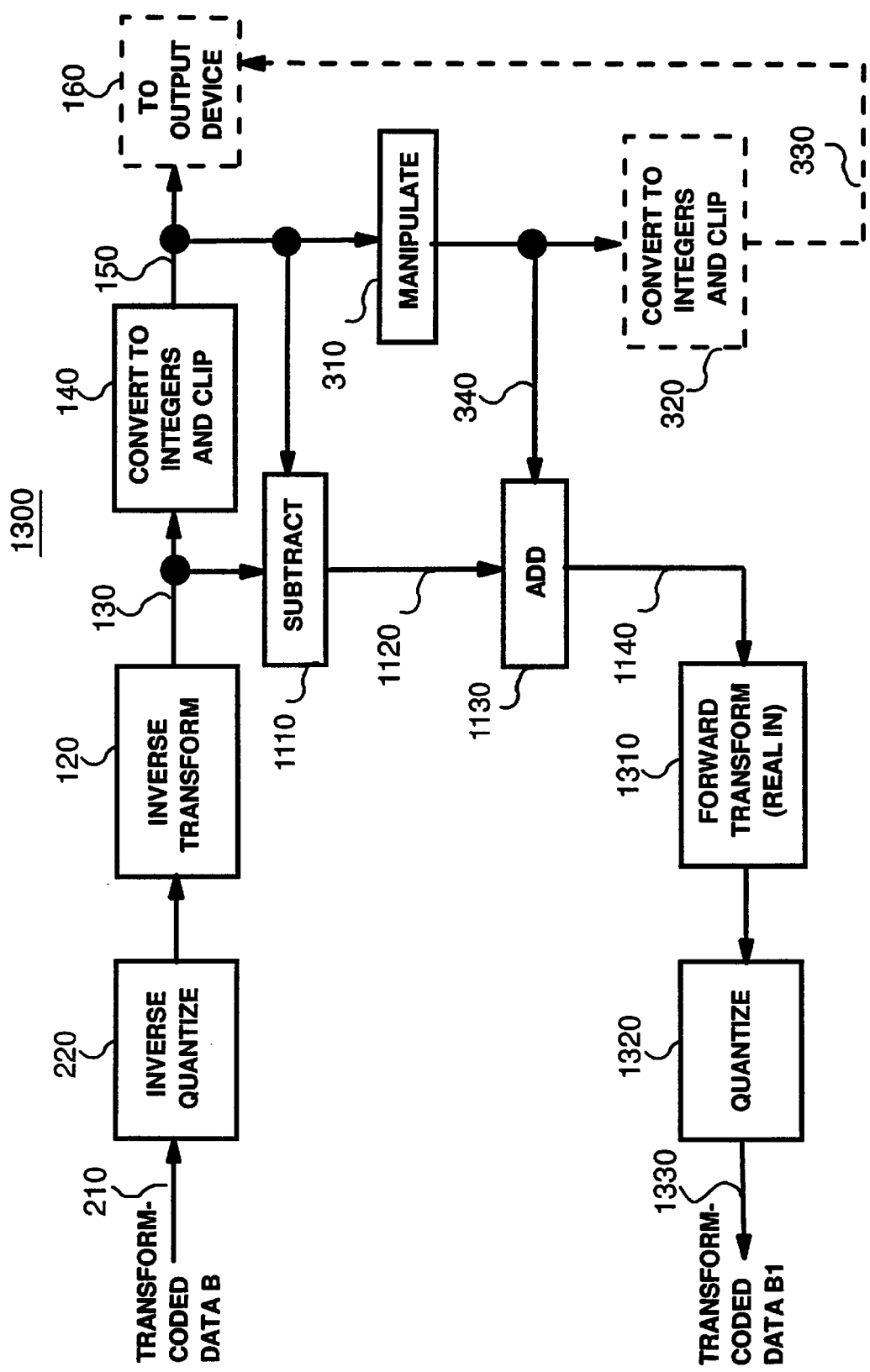
FIG. 13(a) is a block diagram showing an example of a method for performing real-domain manipulation of transform-coded data with reduced error followed by re-coding to the transform domain in accordance with the present invention.

An example embodiment of a method for processing transform-coded data with reduced error 1300 in accordance with the present invention is illustrated in FIG. 13(a). FIG. 13(a) shows integer transform-coded data 'B' 210 are dequantized 220 and the output passed through an inverse transform 120 to produce high-precision real-domain data 130, as in FIGS. 2(a) and 11(a). The processed high-precision data 1140 are used as input to the forward transform 1310, which accepts real-valued data as input. The output of the forward transform 1310 is quantized 1320. Depending upon the desired system implementation, the forward transform operation 1310 may employ a different transform than that used in the inverse transform operation 120. For example, the inverse transform 120 may use the inverse DCT transform whereas the forward transform 1310 may use the Fourier transform. The resulting integer transform data 'B1' 1330 are identical to the original integer transform data 'B' 210 which were the input to the inverse quantize step 220 if: the forward transform operation 1310 is the inverse of the inverse transform operation 120; the quantization values used in the inverse quantization step 220 and the quantization step 1320 are identical; and the manipulation 310 does nothing. It is noted that the forward transform 1310 will produce different integer transform data 'B1' 1330 when a different forward transform is used. Similarly, use of different quantization values in the inverse quantization 220 and quantization 1320 also produces different integer transform data 1330. This method thus allows conversion between transforms and quantization matrices without the errors from rounding and clipping being present in the input 1140 to the forward transform 1310.

It is noted that the conversion between quantization matrices may be for coarser or finer quantizations. For example, when converting data from the JPEG international standard to the MPEG international standard, the quantization is likely to be coarser. The higher quality JPEG independent images are needed during the editing process. The coarser, more compressible, MPEG images are used to achieve the desired bandwidth objectives. On the other hand, in recompressing JPEG images after significant hand editing, the quantization is likely to be finer in order to preserve the changes.

Figure 13B:
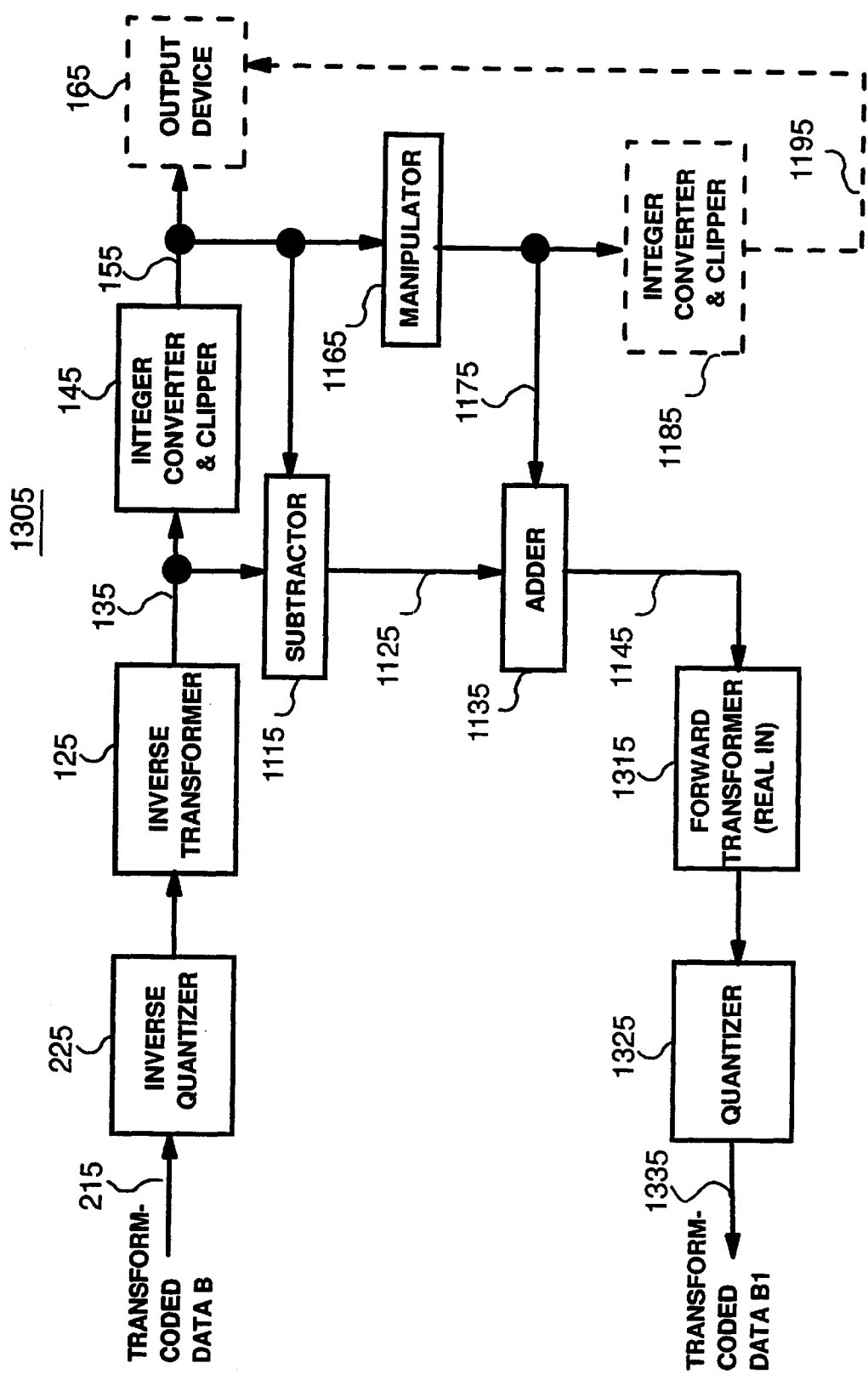
FIG. 13(b) is a block diagram showing an example of a system for performing real-domain manipulation of transform-coded data with reduced error followed by re-coding to the transform domain in accordance with the present invention.

A system for performing real-domain manipulation of transform-coded data with reduced error is illustrated in FIG. 13(b). FIG. 13(b) shows integer transform-coded data 'B' 215 input to an inverse quantizer 225 and passed through an inverse transformer 125 to produce high-precision real-domain data 135, as in FIGS. 2(b) and 11(b). The processed high-precision data 1145 are used as input to the forward transformer 1315, which accepts real-valued data as input. The output of the forward transformer 1315 is passed to the quantizer 1325. Depending upon the desired system implementation, the forward transformer 1315 may employ a different transform than that used in the inverse transformer 125. For example, the inverse transformer 125 may implement the inverse DCT transform whereas the forward transformer 1315 may implement the Fourier transform. The resulting integer transform data 'B1' 1335 are identical to the original integer transform data 'B' 215 which were the input to the inverse quantizer 225 if: the forward transformer 1315 is the inverse of the inverse transformer 125; the quantization values used in the inverse quantizer 225 and the quantizer 1325 are identical; and the manipulator 1165 does nothing. It is noted that the forward transformer 1315 will produce different integer transform data 'B1' when a different forward transform is used. Similarly, use of different quantization values in the inverse quantizer 225 and quantizer 1325 also produces different integer transform data 1335. This method thus allows conversion between transforms and quantization matrices without the errors from rounding and/or clipping being present in the forward transform 1315 input 1145.

Figure 14A:
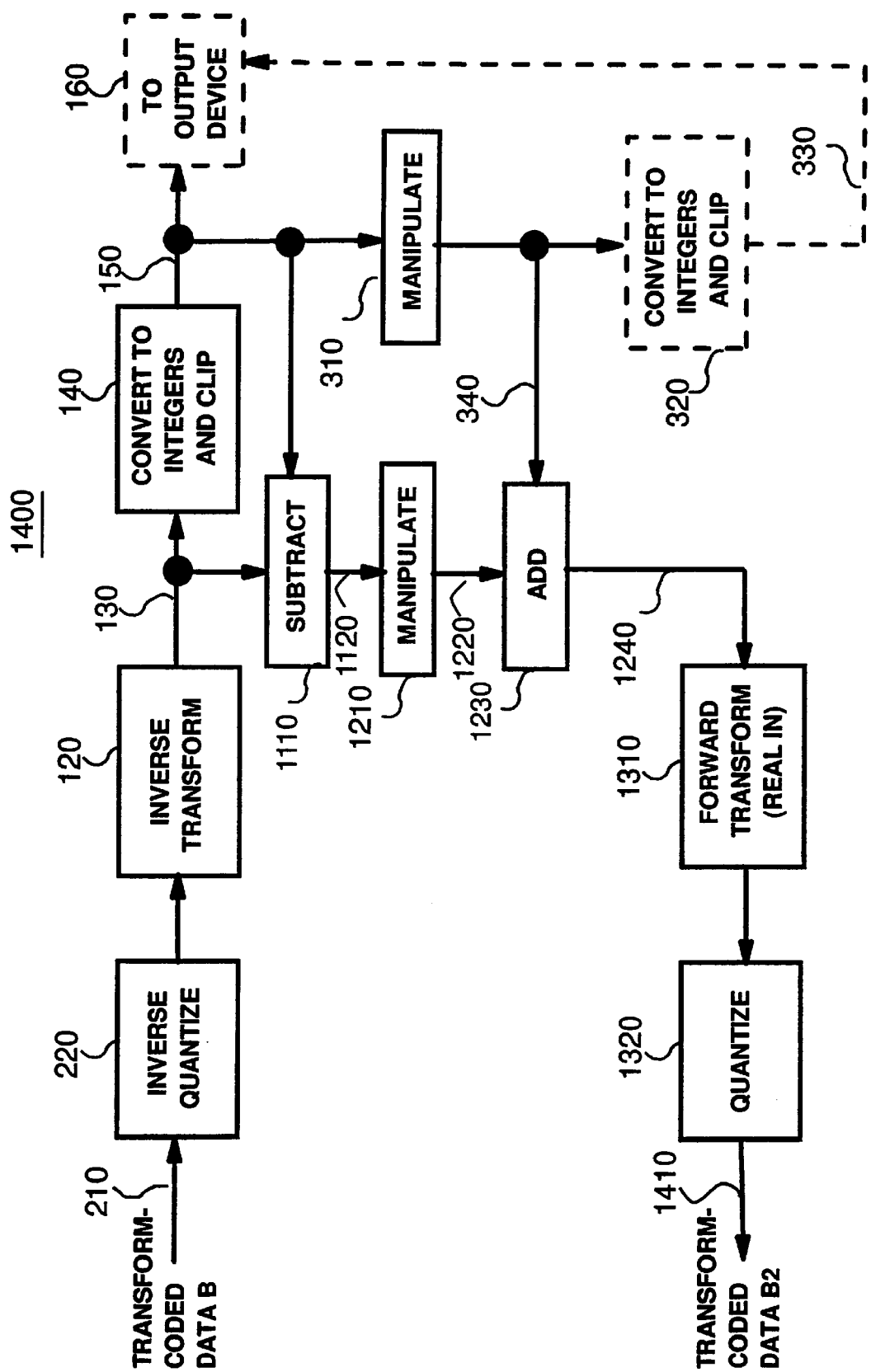
FIG. 14(a) is a block diagram showing an example of a method for performing real-domain manipulation of transform-coded data with reduced error including processing of the high-precision differences followed by re-coding to the transform domain in accordance with the present invention.

An example embodiment of a method for processing transform-coded data with reduced error 1400 in accordance with the present invention is illustrated in FIG. 14(a). This method is formed by extending the method 1300 described in FIG. 13(a). In this embodiment, the high-precision differences 1120 are passed to a manipulation step 1210 which accepts high-precision difference data as input, to produce new manipulated high-precision differences 122 0. The adding step 1230 uses the manipulated high-precision differences 1220 to add back into the output 340 from the traditional manipulating step 310 forming processed high-precision output 1240. The processed high-precision data 1240 are used as input to the forward transform 1310, which accepts real-valued data as input. The output of the forward transform 1310 is quantized 1320 forming transform-coded data 'B2' 1410.

Figure 14B:
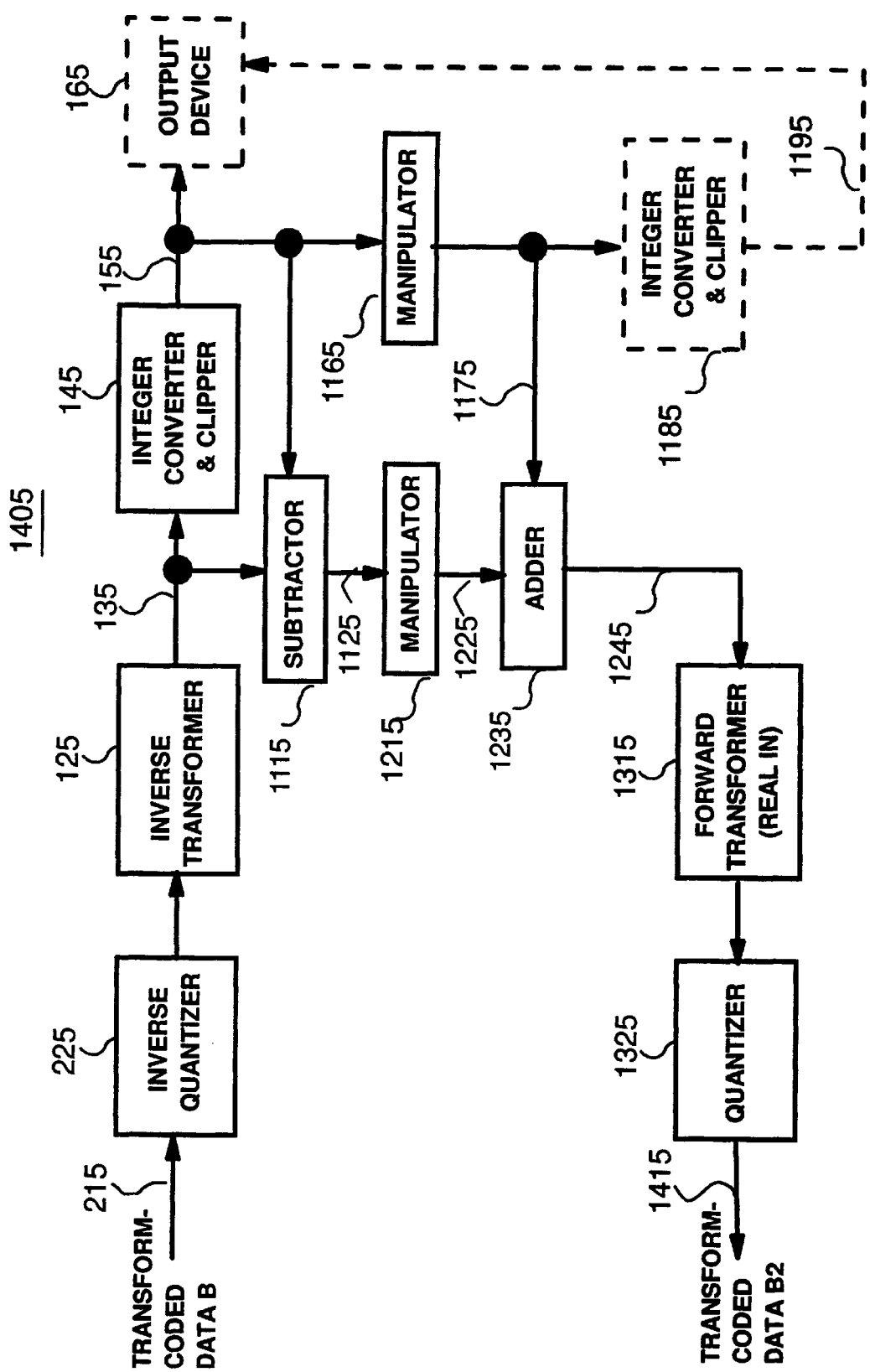
FIG. 14(b) is a block diagram showing an example of a system for performing real-domain manipulation of transform-coded data with reduced error including processing of the high-precision differences followed by re-coding to the transform domain in accordance with the present invention.

An example embodiment of a system for processing transform-coded data with reduced error 1405 in accordance with the present invention is illustrated in FIG. 14(b). This method is formed by extending the method 1305 described in FIG. 13(b). In this embodiment, the high-precision differences 1125 are passed to a manipulator 1215 which accepts high-precision difference data as input, to produce new manipulated high-precision differences 1225. The adder 1235 uses the manipulated high-precision differences 1225 to add back into the output 1175 from the traditional manipulator 1165 forming processed high-precision output 1245. The processed high-precision data 1245 are used as input to the forward transformer 1315, which accepts real-valued data as input. The output of the forward transformer 1315 is passed to the quantizer 1325 forming transform-coded data 'B2' 1415.

Figure 15A:
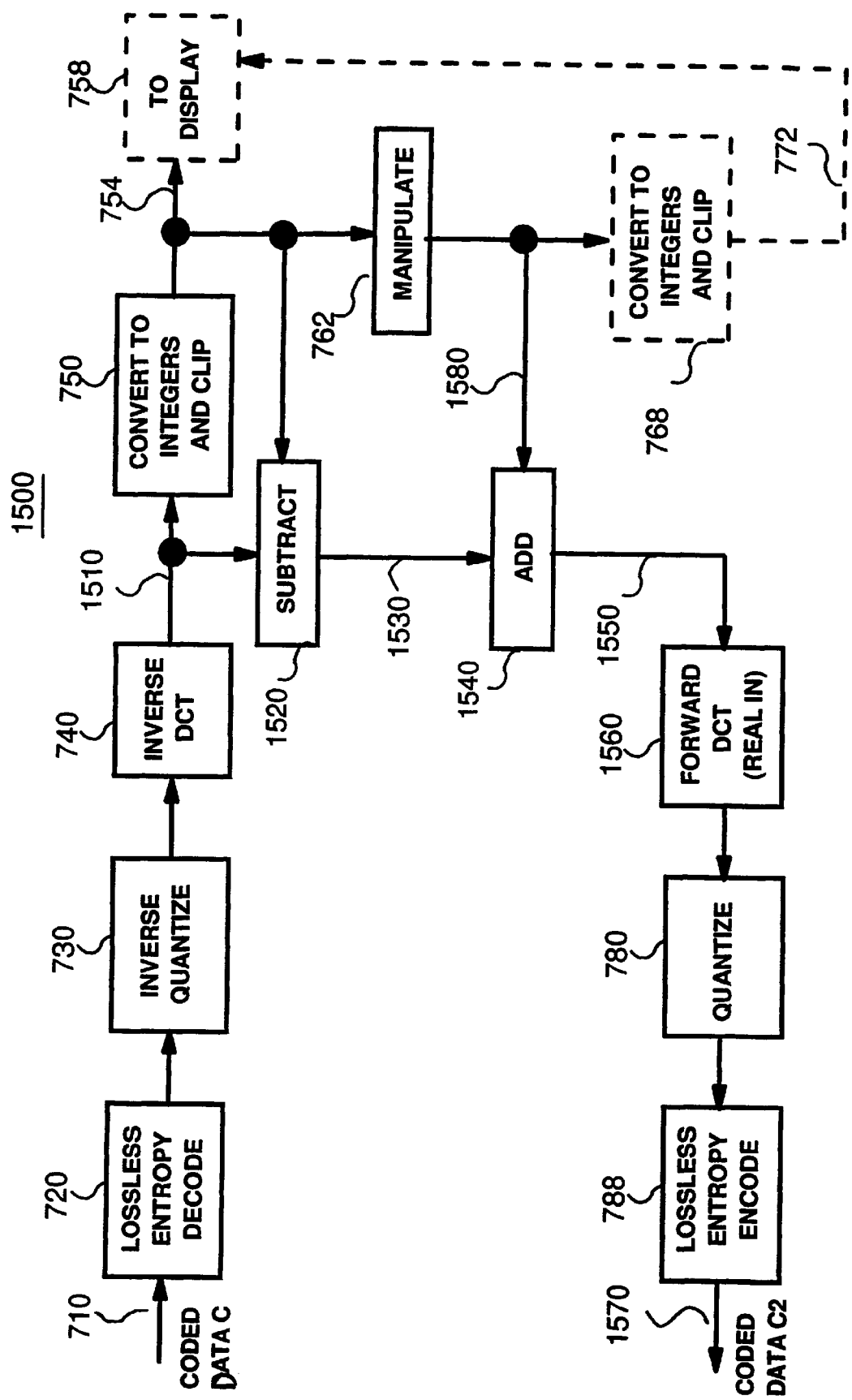
FIG. 15(a) is a block diagram showing an example embodiment of a method for performing real-domain processing of coded image data, such that undesired errors in the new transform-coded data are reduced or eliminated in accordance with the present invention.

An example embodiment of a method for real-domain manipulation of transform-coded data with reduced error 1500 is shown in FIG. 15(a). The chosen embodiment is a method for real-domain manipulation of coded images, which are transform-coded using the DCT such as JPEG-coded images. Coded data 'C' 710 are decoded by a lossless entropy decode step 720 to produce quantized DCT coefficients. These coefficients are dequantized 730 and passed through an inverse DCT 740 to produce high-precision real-domain data 1510. The integer converter and clipper 750 operates on the high-precision data 1510 to produce integer real-domain data 754. In some cases, the integer-valued data are optionally sent to a display 758. The subtracting step 1520 subtracts the high-precision numbers 1510 from the converted integer data 754 forming high-precision differences 1530. The manipulation step 762 operates on the real-domain converted data 754 accepting integer data as input and producing either integer data or high-precision data 1580 as output. After the manipulation, the add step 1540 adds the manipulated data 1580 to the high-precision differences 1530 to form manipulated high-precision numbers 1550. If it is necessary to pass the manipulated image data to a display 758 which takes integer-valued input, or to generate integer-valued image data 772 after manipulation for any other reason, the steps of converting to integers and clipping to an allowed range 768 are performed after manipulation 762.

The high-precision image data 1550 are passed as input to a forward DCT 1560 which accepts high-precision data as input. The output values from the forward DCT 1560 are quantized 780 to produce new integer DCT coefficients. These coefficients are encoded by a lossless entropy encode step 788 to produce new coded data 'C2' 1570. If the forward and inverse DCT and the manipulation system are sufficiently accurate so that the error they introduce is less than half a quantization step, as described in Equation (3) given above, no error at all is introduced to the DCT coefficients.

Figure 15B:
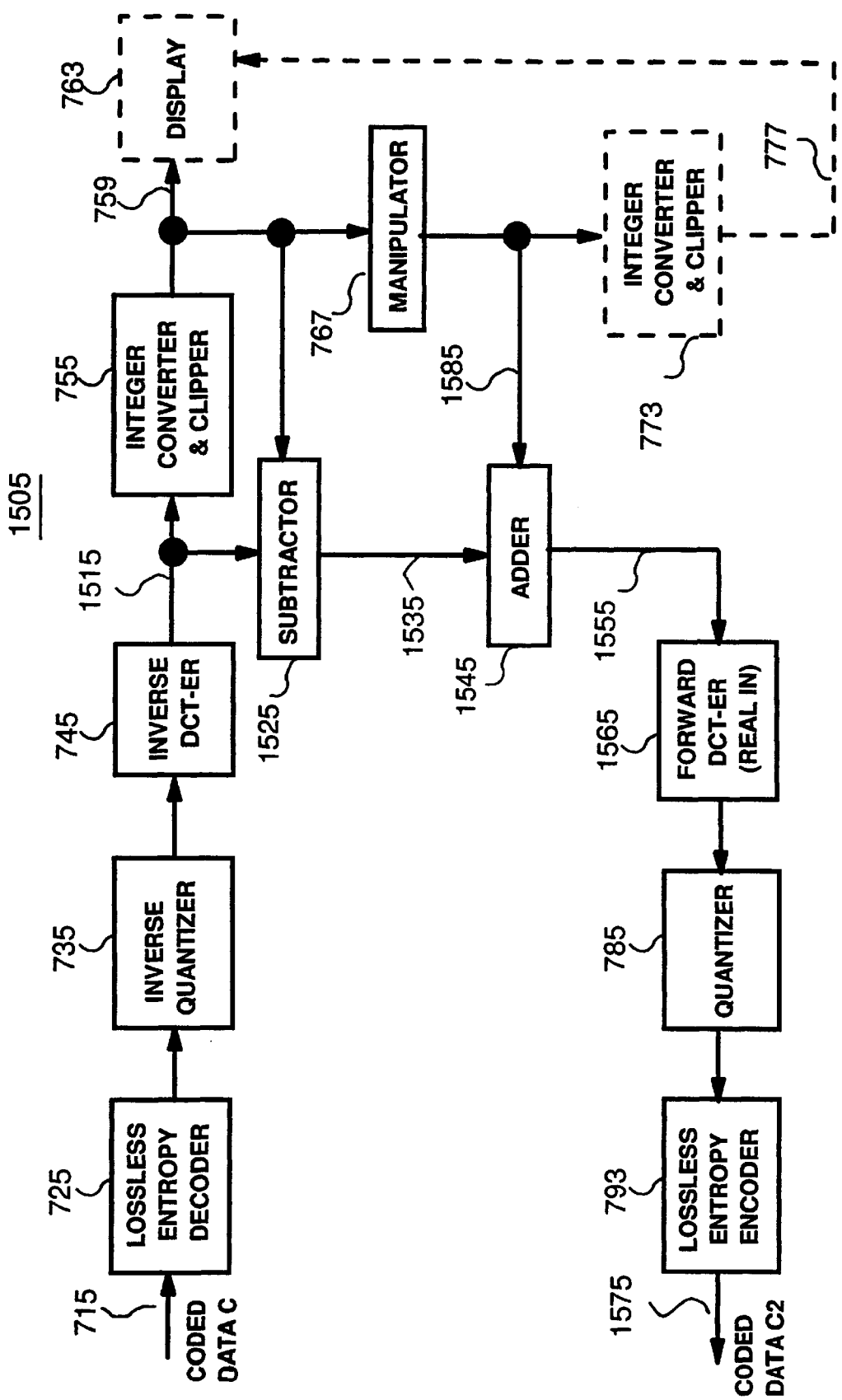
FIG. 15(b) is a block diagram showing an example embodiment of a system for performing real-domain processing of coded image data, such that undesired errors in the new transform-coded data are reduced or eliminated in accordance with the present invention.

An example invention embodiment of a system for real-domain manipulation of transform-coded data with reduced error 1505 is shown in FIG. 15(b). The chosen embodiment is to implement a system for real-domain manipulation of coded images, which are transform-coded using the DCT. Coded image data 'C' 715 are decoded by a lossless entropy decoder 725 to produce quantized DCT coefficients. These coefficients are sent to an inverse quantizer 735 and then passed through an inverse DCT-er 745 to produce high-precision real-domain data 1515. The integer converter and clipper 755 operates on the high-precision data 1515 to produce integer real-domain data 759. In some cases, the integer-valued data are optionally sent to a display 763. The subtractor 1525 subtracts the high-precision numbers 1515 from the converted integer data 759 forming high-precision differences 1535. The manipulator 767 operates on the real-domain converted data 759 accepting integer data as input and producing either integer data or high-precision data 1585 as output. After the manipulation, the adder 1545 adds the manipulated data 1585 to the high-precision differences 1535 to form manipulated high-precision numbers 1555. If it is necessary to pass the manipulated image data to a display 763 which takes integer-valued input, or to generate integer-valued image data 777 after manipulation for any other reason, the integer converter and clipper 773 operates on the integer converted data 1585 after manipulation 767. The manipulated high-precision image data 1555 are passed as input to a forward DCT-er 1565 which accepts high-precision data as input. The output values from the forward DCT 1565 are passed to a quantizer 785 to produce new integer DCT coefficients. These coefficients are encoded by a lossless entropy encoder 793 to produce new coded data 'C2' 1575.

Figure 16A:
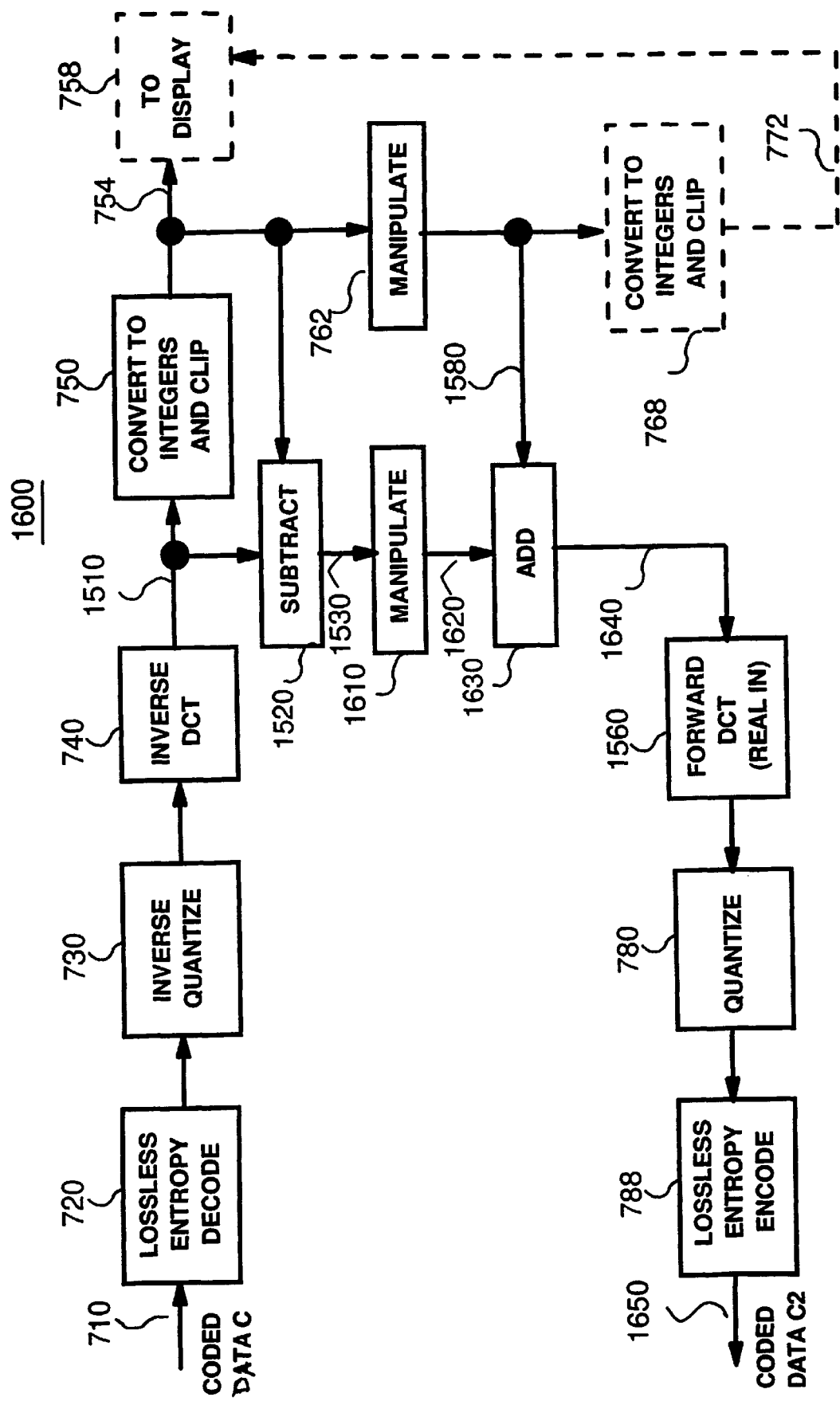
FIG. 16(a) is a block diagram showing an example embodiment of a method for performing real-domain processing of coded image data including processing of the high-precision differences, such that undesired errors in the new transform-coded data are reduced or eliminated in accordance with the present invention.

An example embodiment of a method for processing coded data with reduced error 1600 in accordance with the present invention is illustrated in FIG. 16(a). This method is formed by extending the method 1500 described in FIG. 15(a). In this embodiment, the high-precision differences 1530 are passed to a manipulation step 1610 which accepts high-precision difference data as input, to produce new manipulated high-precision differences 1620. The adding step 1630 uses the manipulated high-precision differences 1620 to add back into the output 1580 from the traditional manipulating step 762 forming processed high-precision output 1640. The processed high-precision data 1640 are used as input to the forward DCT 1560, which accepts real-valued data as input. The output of the forward transform 1560 is quantized 780 forming transform-coded data. The transform-coded data is passed to an entropy encode step 788 to produce coded data 'C3' 1650.

Figure 16B:
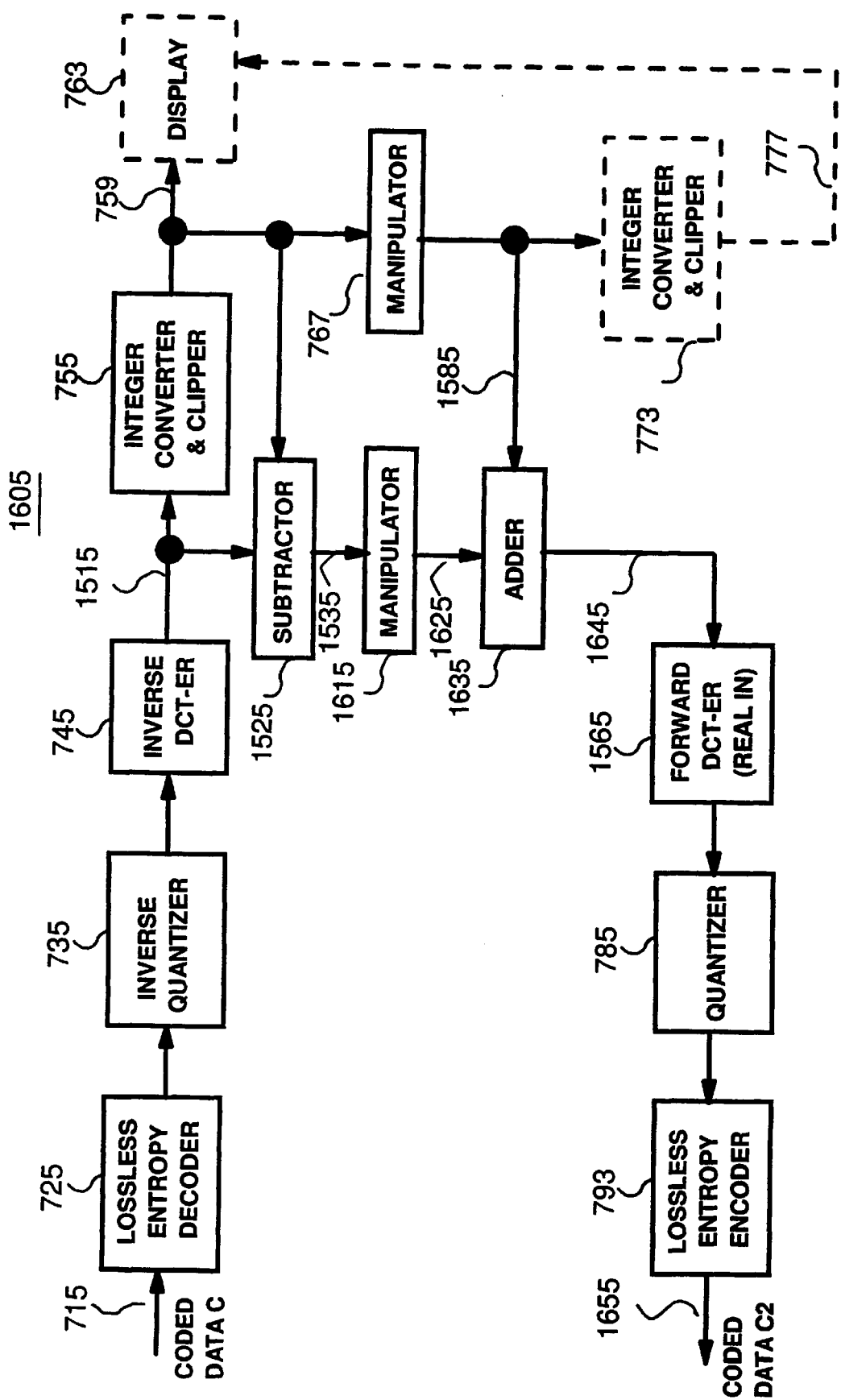
FIG. 16(b) is a block diagram showing an example embodiment of a system for performing real-domain processing of coded image data including processing of the high-precision differences, such that undesired errors in the new transform-coded data are reduced or eliminated in accordance with the present invention.

An example embodiment of a system for processing coded data with reduced error 1605 in accordance with the present invention is illustrated in FIG. 16(b). This system is formed by extending the system 1505 described in FIG. 15(b). In this embodiment, the high-precision differences 1535 are passed to a manipulator 1615 which accepts high-precision difference data as input, to produce new manipulated high-precision differences 1625. The adder 1635 uses the manipulated high-precision differences 1625 to add back into the output 1585 from the traditional manipulator 767 forming processed high-precision output 1645. The processed high-precision data 1645 are used as input to the forward DCT-er 1565, which accepts real-valued data as input. The output of the forward transform 1565 is passed to a quantizer 785 which outputs transform-coded data. The transform-coded data is passed to an entropy encoder 793 to produce coded data 'C3' 1655.

Figure 17A:
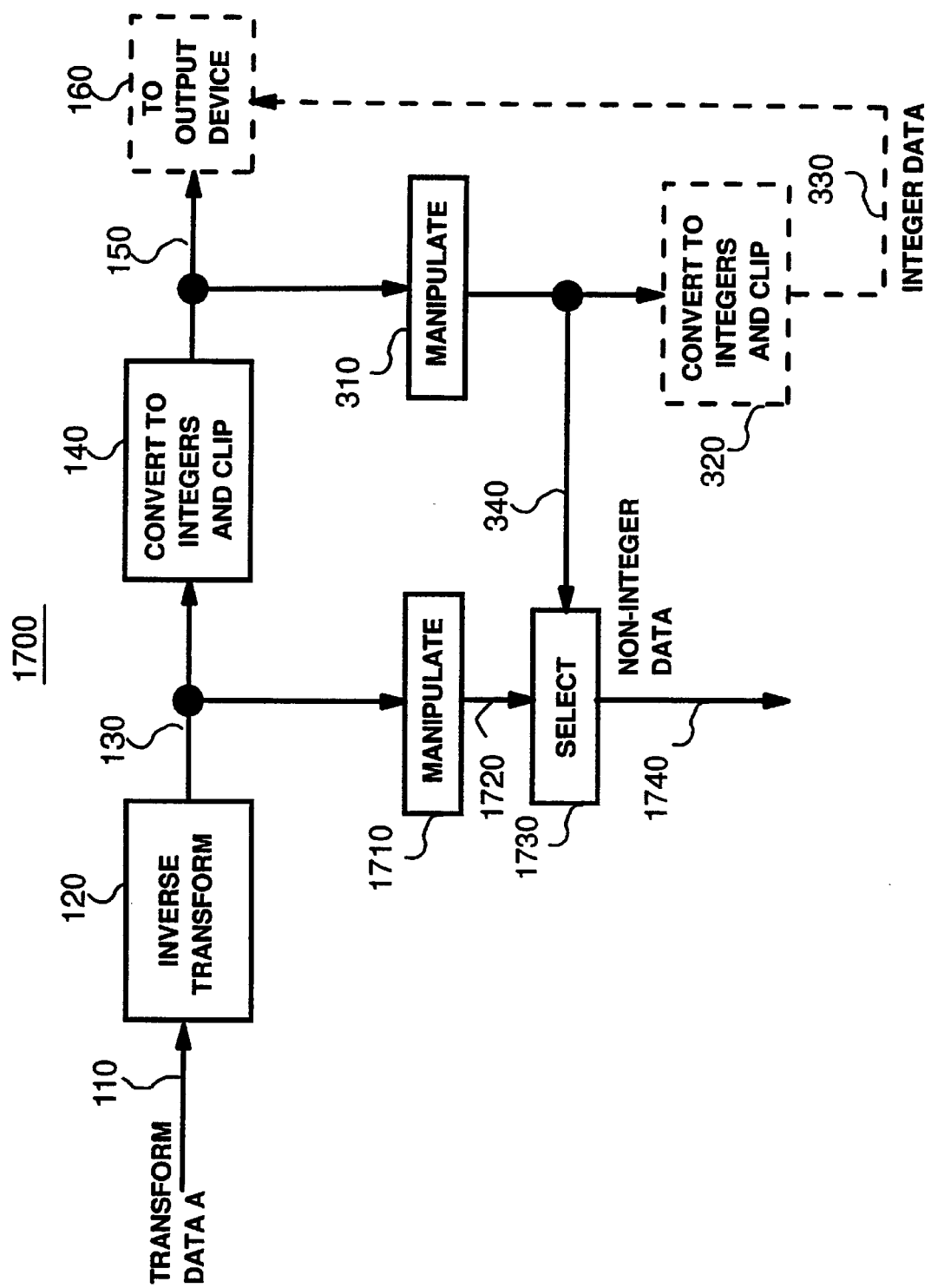
FIG. 17(a) is a block diagram showing an example of a method for reduced-error processing of transform data including selecting between manipulated high-precision numbers and the manipulated converted data in accordance with the present invention.

FIG. 17(a) shows a method for performing real-domain manipulation of transform data with reduced error 1700. In this embodiment, the high-precision numbers 130 are passed to a manipulation step 1710 which accepts high-precision numbers as input, to produce new manipulated high-precision numbers 1720. The selecting step 1730 selects between the manipulated high-precision numbers 1720 and the output 340 from the traditional manipulating step 310 forming processed high-precision output 1740.

If the traditional manipulating step 310 performs a 90 degree rotation on the converted data, then the high-precision numbers also need to be rotated by 90 degrees. If the traditional manipulating step 310 merges two data sets, such as by the chroma-keying method, then the high-precision numbers may be merged in the manipulation step 1710 to correspond to the manipulated converted data. Alternately, the manipulation step can be skipped and the selecting step 1730 can chose the high-precision value from the data set which is closest to the processed converted data. If neither high-precision value would have been converted to the processed converted data in the convert to integers and clip step 140, then the processed converted data is output at high precision. For some manipulations such as color correction of the converted data, the processed converted data will be always be selected since the high-precision data are no longer close to the processed converted data.

Figure 17B:
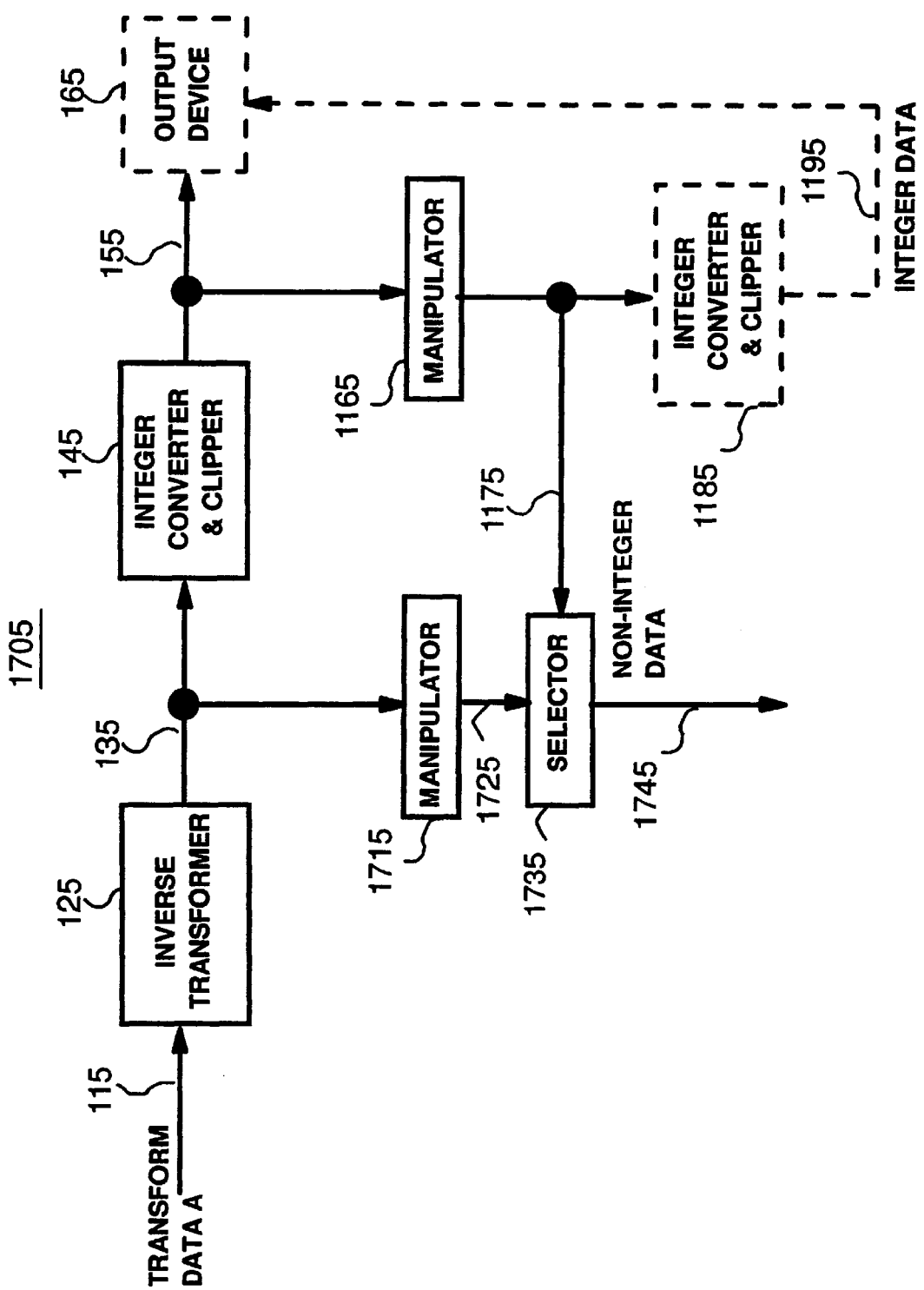
FIG. 17(b) is a block diagram showing an example of a system for reduced-error processing of transform data including selecting between manipulated high-precision numbers and the manipulated converted data in accordance with the present invention.

FIG. 17(b) shows a system for performing real-domain manipulation of transform data with reduced error 1705. In this embodiment, the high-precision numbers 1115 are passed to a manipulator 1715 which accepts high-precision numbers as input, to produce new manipulated high-precision numbers 1725. The selector 1735 selects between the manipulated high-precision numbers 1725 and the output from the traditional manipulating step 1165 forming processed high-precision output 1740.

Figure 18A:
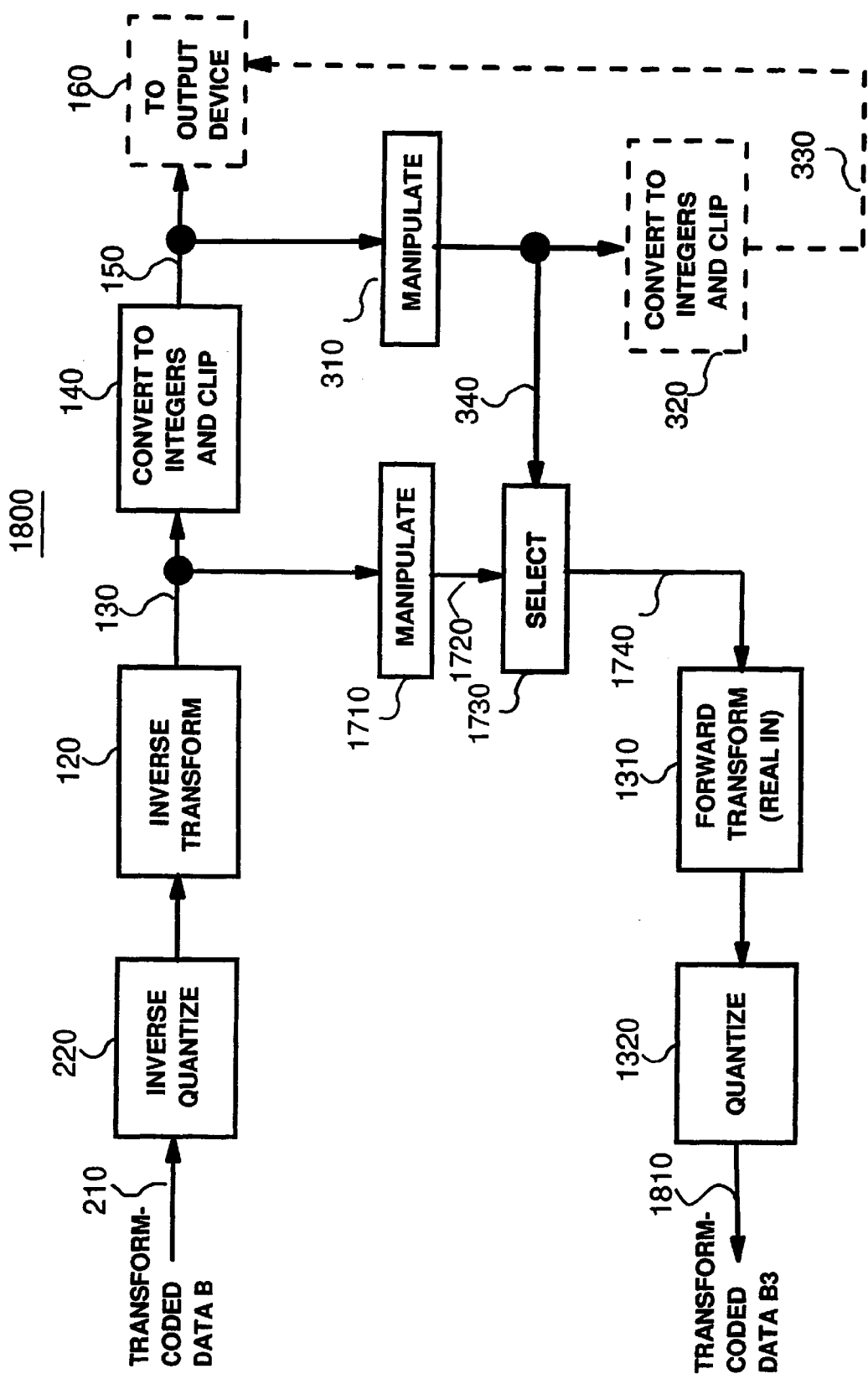
FIG. 18(a) is a block diagram showing an example of a method for performing real-domain manipulation of transform-coded data with reduced error including selecting between the manipulated high-precision numbers and the manipulated converted data followed by re-coding to the transform domain in accordance with the present invention.

An example embodiment of a method for processing transform-coded data with reduced error 1800 in accordance with the present invention is illustrated in FIG. 18(a). FIG. 18(a) shows integer transform-coded data 'B' 210 are dequantized 220 and the output passed through an inverse transform 120 to produce high-precision real-domain data 130, as in FIG. 17(a). The processed high-precision data 1740 are used as input to the forward transform 1310, which accepts real-valued data as input. The output of the forward transform 1310 is quantized 1320. Depending upon the desired system implementation, the forward transform operation 1310 may employ a different transform than that used in the inverse transform operation 120. For example, the inverse transform 120 may use the inverse DCT transform whereas the forward transform 1310 may use the Fourier transform. The resulting integer transform data 'B3' 1810 are identical to the original integer transform data 'B' 210 which were the input to the inverse quantize step 220 if the forward transform operation 1310 is the inverse of the inverse transform operation 120, the quantization values used in the inverse quantization step 220 and the quantization step 1320 are identical, and the manipulation 310 does nothing. It is noted that the forward transform 1310 will produce different integer transform data 'B3' 1810 when a different forward transform is used. Similarly, use of different quantization values in the inverse quantization 220 and quantization 1320 also produces different integer transform data 1810. This method thus allows conversion between transforms and quantization matrices without the errors from rounding and clipping being present in the forward transform 1310 input 1740.

Figure 18B:
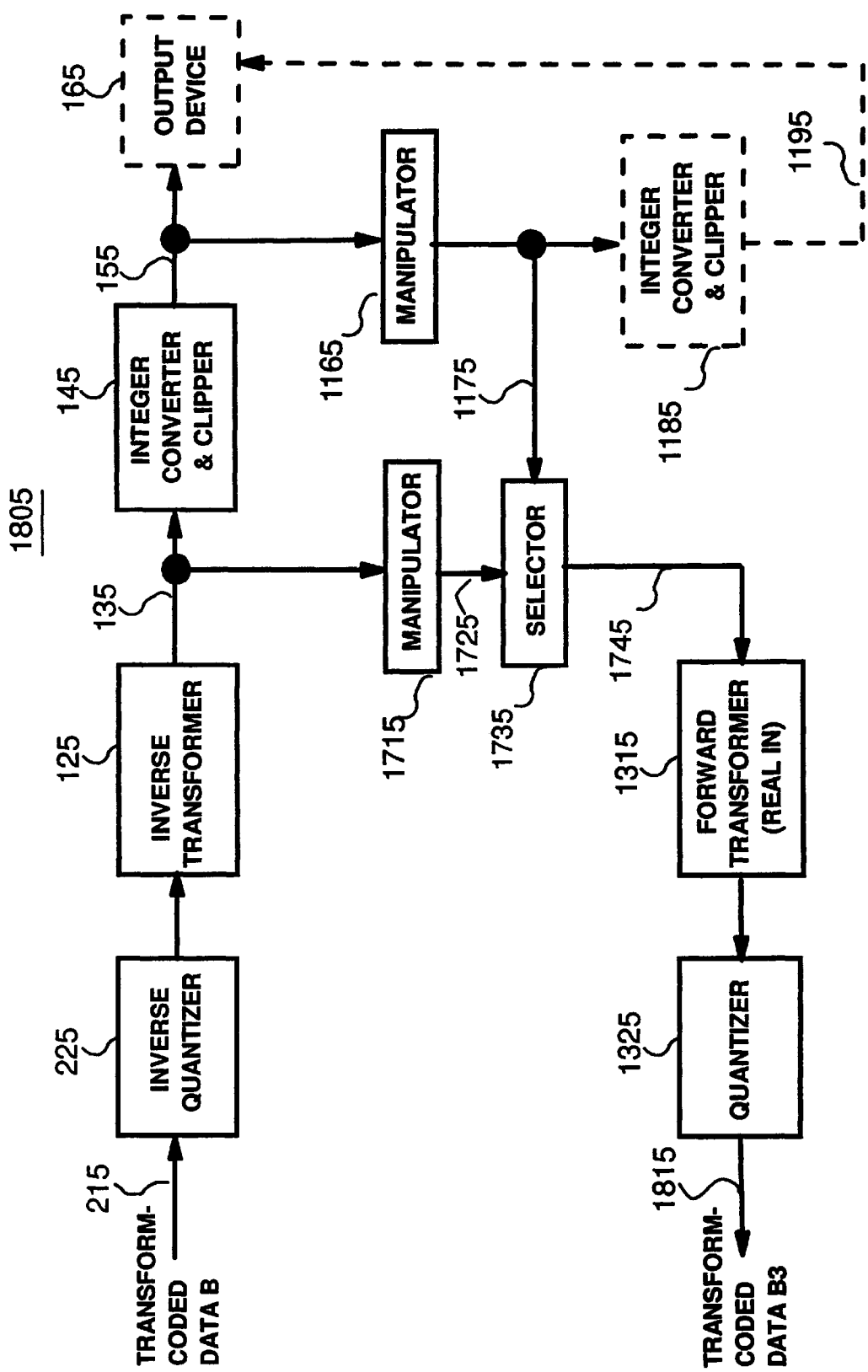
FIG. 18(b) is a block diagram showing an example of a system for performing real-domain manipulation of transform-coded data with reduced error including selecting between the manipulated high-precision numbers and the manipulated converted data followed by re-coding to the transform domain in accordance with the present invention.

A system for performing real-domain manipulation of transform-coded data with reduced error is illustrated in FIG. 18(b). FIG. 18(b) shows integer transform-coded data 'B' 215 input to an inverse quantizer 225 and passed through an inverse transformer 125 to produce high-precision real-domain data 1115, as in FIG. 17(b). The processed high-precision data 1745 are used as input to the forward transformer 1315, which accepts real-valued data as input. The output of the forward transformer 1315 is passed to the quantizer 1325. Depending upon the desired system implementation, the forward transformer 1315 may employ a different transform than that used in the inverse transformer 125. For example, the inverse transformer 125 may implement the inverse DCT transform whereas the forward transform 1315 may implement the Fourier transform. The resulting integer transform data 'B2' 1815 are identical to the original integer transform data 'B' 215 which were the input to the inverse quantizer 225 if the forward transformer 1315 is the inverse of the inverse transformer 125, the quantization values used in the inverse quantizer 225 and the quantizer 1325 are identical, and the manipulator 1165 does nothing. It is noted that the forward transformer 1315 will produce different integer transform data 'B1' when a different forward transform is used. Similarly, use of different quantization values in the inverse quantizer 225 and quantizer 1325 also produces different integer transform data 1815. This method thus allows conversion between transforms and quantization matrices without the errors from rounding and clipping being present in the forward transform 1315 input 1745.

Figure 8C:
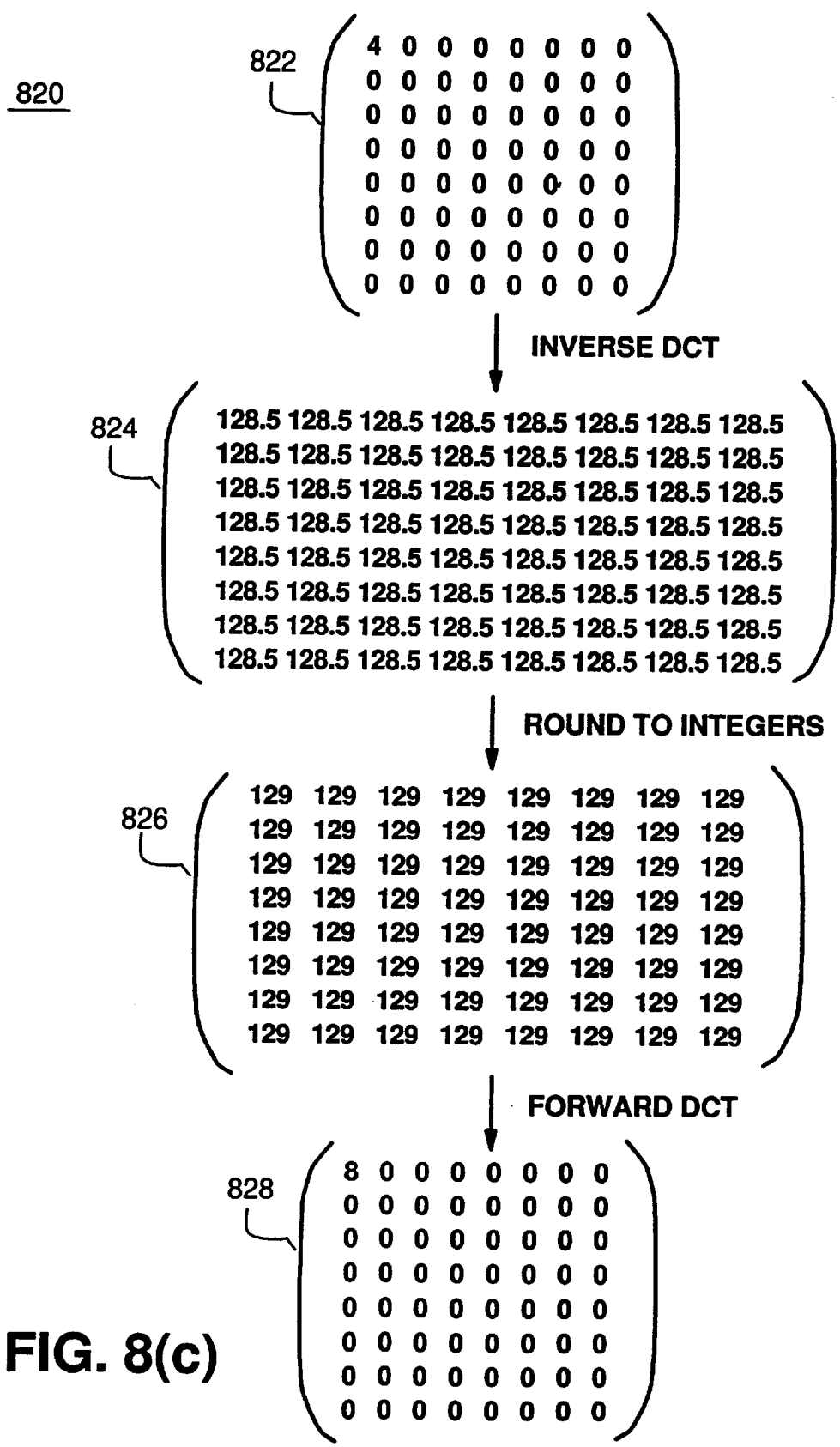
FIG. 8(c) is a numerical example of how real-domain rounding can cause significant errors in 8×8 block DCT coded data.

Having described the present invention, the particular embodiment in FIG. 18(a) is used to demonstrate how the rounding errors in FIG. 8(c) are not present in the real input to the forward DCT. The matrix of high-precision numbers is given in matrix 824. The converted data after rounding are given in matrix 826. The selecting step 1730 selects for each matrix position the high-precision value of 128.5 because the 129 converted values are rounded versions of 128.5. The forward DCT with JPEG conventions for the normalization constants exactly return the original values in matrix 822, since the rounding errors are not present in the high-precision numbers. The same result is obtained if the high-precision numbers were differenced with the converted data and the differences added back into the data before the forward DCT.

Figure 8D:
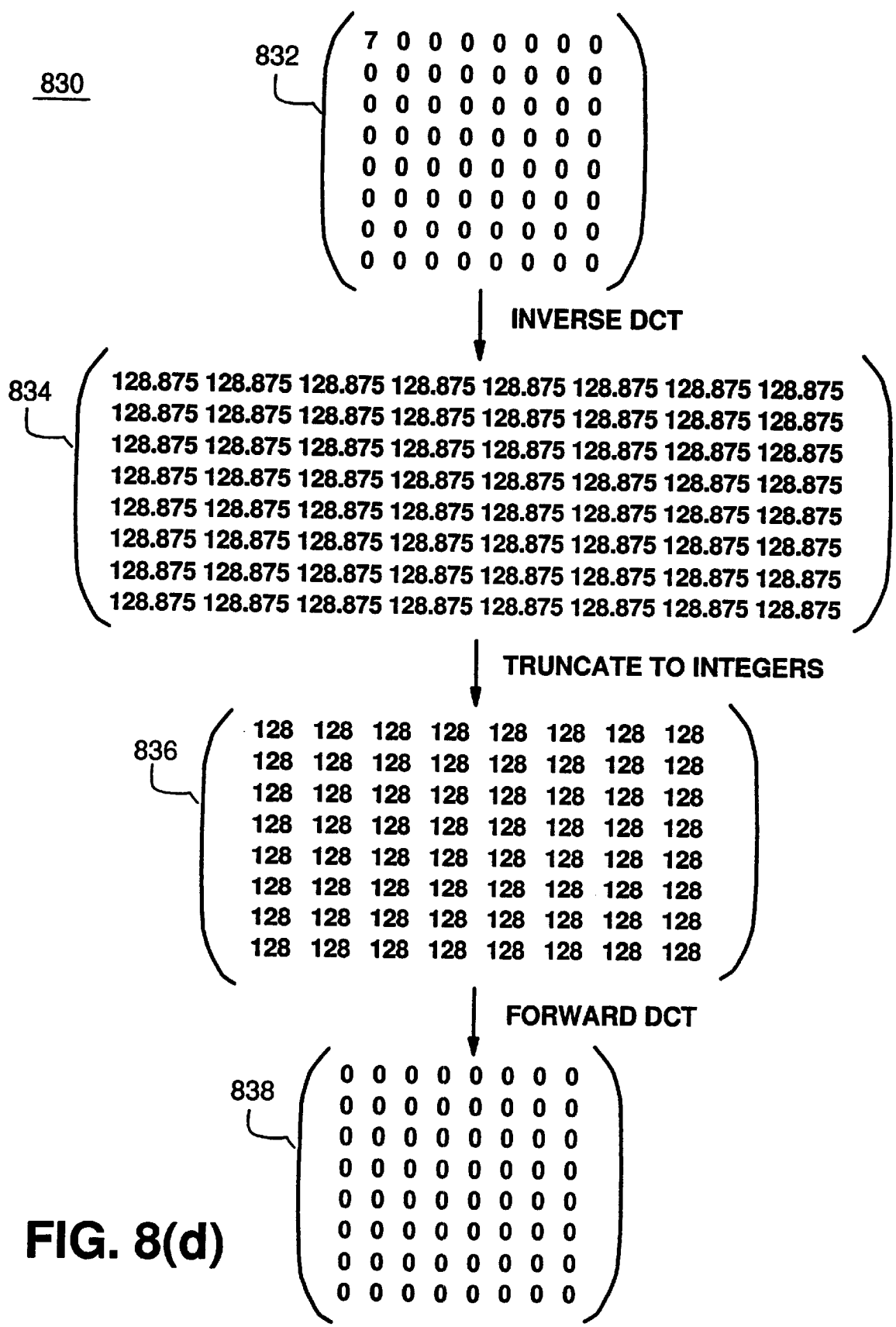
FIG. 8(d) is a numerical example of how real-domain truncation can cause significant errors in 8×8 block DCT coded data.
Figure 8E:
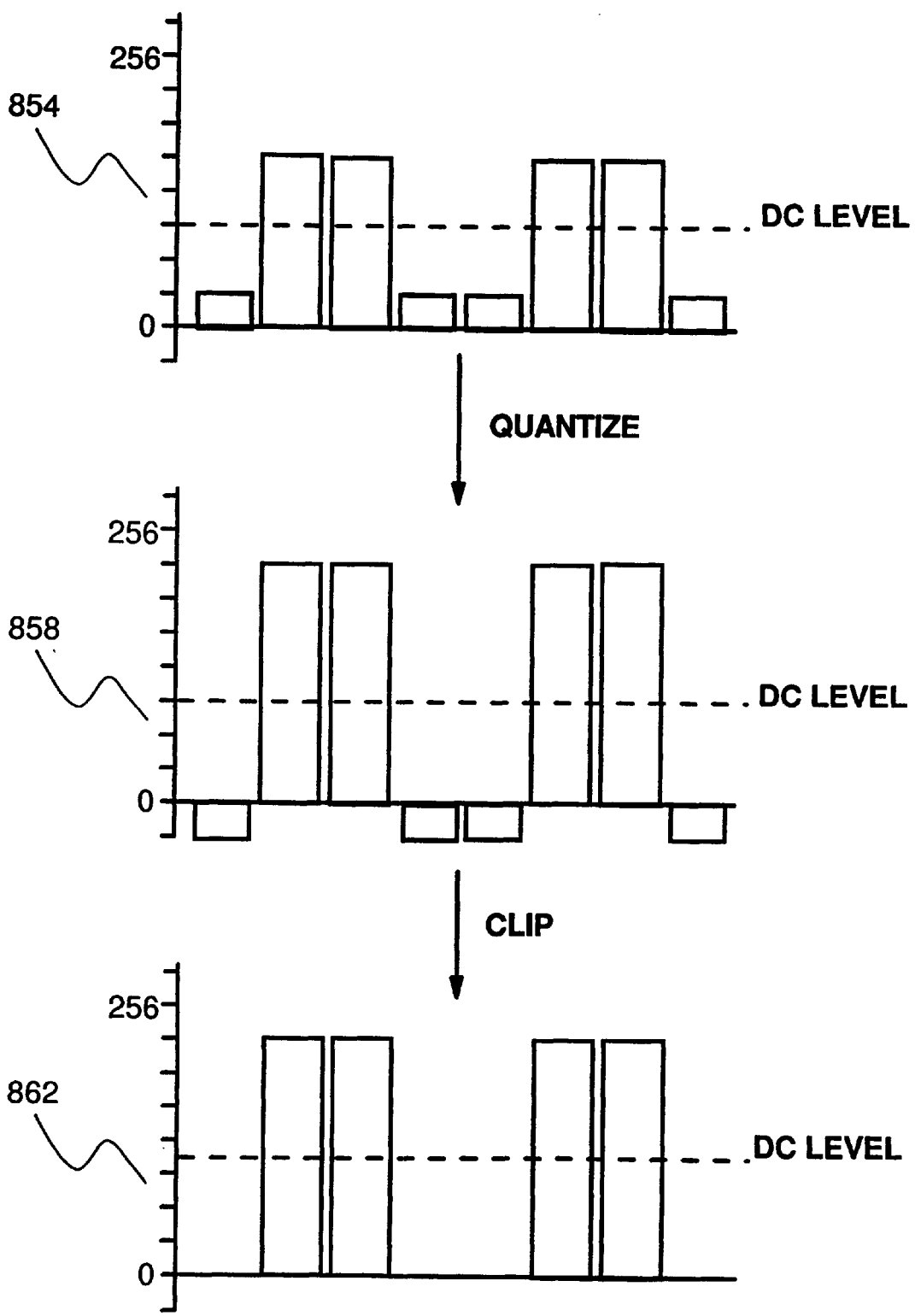
FIG. 8(e) is a series of graphs illustrating how real-domain clipping can cause errors in one-dimensional discrete cosine transform-coded data.

The method illustrated in FIG. 18(a) is used to demonstrate how the truncating errors in FIG. 8(d) are not present in the real input to the forward DCT. The matrix of high-precision numbers is given in matrix 834. The converted data after truncating are given in matrix 836. The selecting step 1730 selects for each matrix position the high-precision value of 128.875 because the 128 converted values are truncated versions of 128.875. The forward DCT with JPEG conventions for the normalization constants exactly return the original values in matrix 832, since the truncating errors are not present in the high-precision numbers. The same result is obtained if the high-precision numbers were differenced with the converted data and the differences added back into the data before the forward DCT.

Figure 8G:
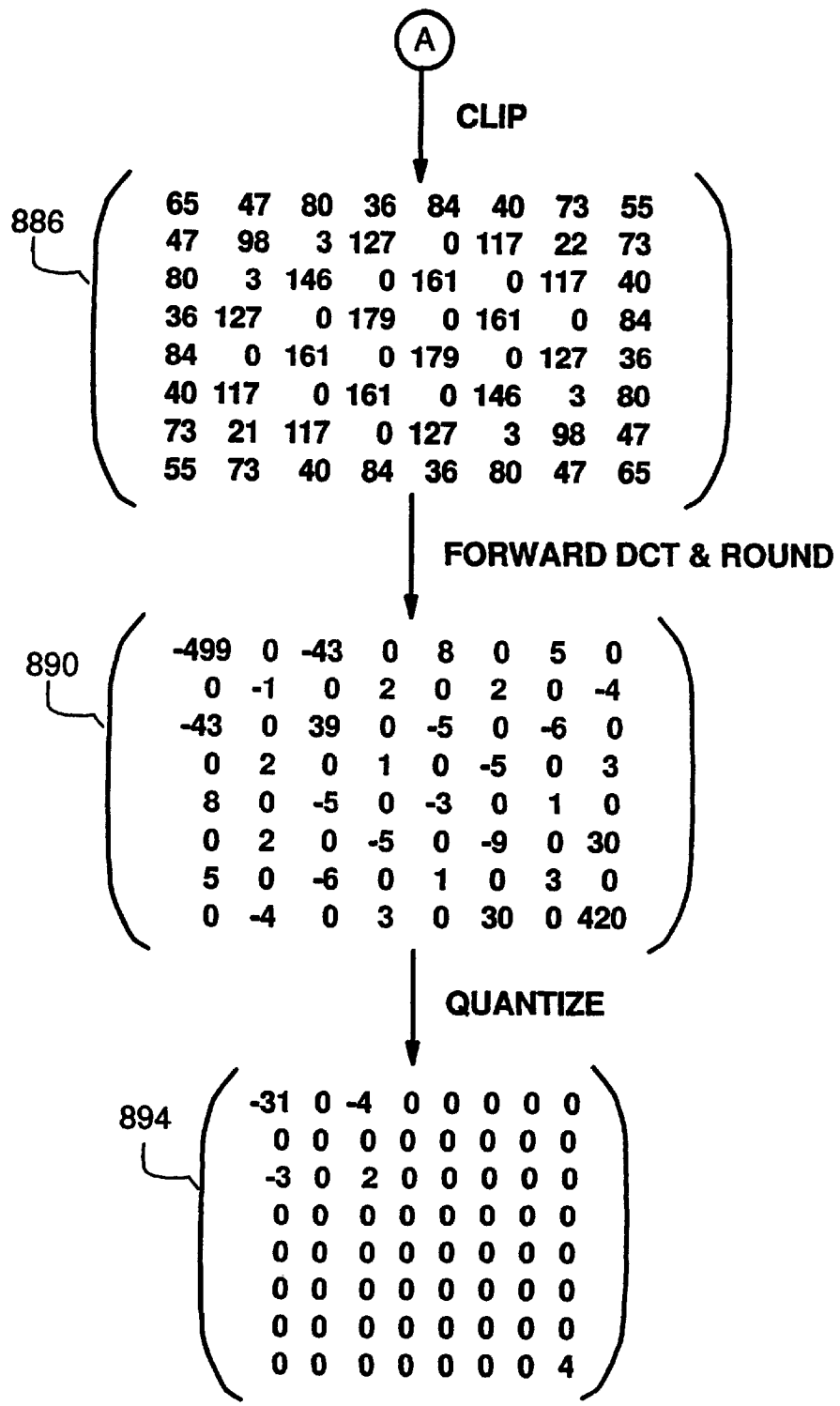

The method illustrated in FIG. 18(a) is used to demonstrate how the clipping errors in FIGS. 8(f) and 8(g) are not present in the real input to the forward DCT. The matrix of unclipped values is given in matrix 882. The converted data after clipping are given in matrix 886. The selecting step 1730 selects the unclipped value because the clipped converted value are at an extreme of the range (0). The forward DCT with JPEG conventions for the normalization constants exactly return the original values in matrix 878, since the clipping errors are not present in the input to the forward DCT. The same result is obtained if the unclipped values were differenced with the converted data and the differences added back into the data before the forward DCT.

In an alternate embodiment of the present invention a method for performing real-domain manipulations of transform-coded data with reduced error in multiple steps, alternating the subtracting, manipulatings, and adding steps with forward transforming and quantizing steps and inverse quantizing and inverse transforming steps, is implemented. Refer back to FIG. 10 where instead of passing the integer output to perform each of the forward transforms 950, the steps from FIG. 17(a) of selecting 1730 between the high-precision numbers and the processed converted data to form processed high-precision numbers input to a forward transform step that takes high-precision input removes the errors from converting to integers and clipping. FIG. 18(a) illustrates one cycle of such a multi-generation system. FIG. 13(a) illustrates another embodiment of one cycle of a multi-generation method. FIG. 14(a) illustrates another embodiment of one cycle of a multi-generation method including a manipulating step which operates on the high-precision differences.

Still another alternate embodiment of the present invention implements a system for performing real-domain manipulations of transform-coded data with reduced error in multiple steps, alternating the subtractor, manipulators, and adder with a forward transformer and quantizer and a inverse quantizer and inverse transformer. Refer to FIG. 13(b) which illustrates one cycle of a multi-generation system. FIG. 14(b) illustrates another embodiment of one cycle of a multi-generation system including a manipulator which operates on the high-precision differences. FIG. 18(b) illustrates still another embodiment of one cycle of a multi-generation system including a selector that selects between the processed high-precision numbers and the processed converted data to form processed high-precision input to the forward transform.

In general each manipulation may perform another operation on the data. For example for digital studio editing, the first manipulation might color correct the image. The second manipulation might merge the color corrected image with a background using the chroma-keying method. The third manipulation might add highlights to the image. The fourth manipulation might crop the image to convert from the 16:9 width to height aspect ratio of movies to the 4:3 aspect ratio of television. For the printing of images the first manipulation might rotate the image 90 degrees to orient the image with the printing direction. The second manipulation might merge several independent images into one composite image. A third manipulation might do a color conversion. For coded image data the output device may be a display or television set. For coded audio data the output device may be a player and/or recorder.

Examples of the manipulation between generations include merging two or more transform-coded data sets. For transform-coded image data sets, the merging may be needed because multiple small images need to be collected into one bigger picture. Fan-folded advertising brochures typically are composed of multiple individual pictures. Today's highest end laser printers print more than one page at a time. In such cases, the images generally do not overlap, but may not have the same quantization, positioning relative to the reference grid such as the 8×8 block structure for JPEG DCTs, or orientation. By composing the final picture in the real domain, standard processes can be used for each subimage. Then the composite image can be re-compressed for eventual decompression for on-the-fly printing.

Similarly, digital editing can include many special effects requiring several independent manipulations performed serially. Digital movies often use the fade-in/fade-out special effect to perform a smooth transition between two key scenes. Such special effects may follow independent processing of each scene. Thus, multiple generations of decompression and recompression are often needed in the editing to produce the composite of the special effects.

Chroma-keying involves two independent video data streams. In one video stream the background has been captured. In the other video stream the foreground, often composed of action involving live actors, has been filmed against a blank single color such as a deep blue or black background. Then the blank pixels in the foreground image are replaced with pixels from the background video. Since the pixels are being mixed at a single-pixel level, the images need to be combined in the real domain. The errors introduced by converting to integers and clipping are highly undesirable for such digital studio applications. These errors are reduced or eliminated by implementing the present invention.

Another application example for use of the present invention is in the high-end digital graphics market which uses digital images with sometimes more than 100 megapixels. Glossy advertising brochures and the large photographic trade show booth backdrops are just two examples of the use of such high quality digital imagery. High-quality lossy JPEG compression are sometimes used to keep the transmission and storage costs down. As such images are decompressed and recompressed to allow changes and modifications such as adding highlights, correcting colors, adding or changing text and image cropping, unintentional errors are a problem that is solved with the use of the concepts of the present invention.

The above examples for the concepts of the present invention are usual for image and video transform data. The wide use of the Internet has shown the value of JPEG and MPEG compressed image data. When JPEG images are to be printed, then manipulations such as a change of scale or a change of orientation may be required. In addition, a transformation to another color space followed by recompression will allow the print-ready versions of the image to be stored. Use of the present invention overcomes the problem inherent in propagating the errors from the rounding and clipping.

Audio coded data also needs to be decompressed, mixed with special sound effects, merged with other audio data, edited and processed in the real domain with reduced errors. Similar implementations are performed for other industrial, commercial, and military applications of digital processing employing a transform and an inverse transform of data representing a phenomenon when the data is stored in the transform domain. These are thus other representative applications wherein the use of the present invention is highly advantageous.

It is further noted that this invention may also be provided as an apparatus or a computer product. For example, it may be implemented as an article of manufacture comprising a computer usable medium having computer readable program code means embodied therein for causing a computer to perform the methods of the present invention.

It is noted that although the description of the invention is made for particular arrangements of steps, the intent and concept of the present invention are suitable and applicable to other arrangements. It will be clear to those skilled in the art that other modifications to the disclosed embodiments can be effected without departing from the spirit and scope of the invention.

We claim:

1. A method for digitally processing transform data representing a phenomenon, the method comprising:

performing an inverse transform of said transform data to the real domain forming initial high-precision numbers;

converting said initial high-precision numbers to integers and clipping the integers to an allowed range forming initial converted data;

manipulating said initial converted data to produce an effect and forming processed converted data; and selecting between said high-precision numbers and said processed converted data forming processed high-precision numbers.

2. A method as recited in claim 1, wherein said selecting step comprises selecting said processed converted data if processed converted data are different from the converted data formed from said high-precision numbers.

3. A method as recited in claim 1, wherein the phenomenon is an image.

4. A method as recited in claim 1, wherein said high-precision numbers are floating point numbers.

5. A method as recited in claim 1, wherein the step of performing employs an inverse discrete Fourier transform.

6. A method as recited in claim 1, further comprising performing a forward transform of said processed high-precision numbers forming processed transform data.

7. A method as recited in claim 6, further comprising performing an inverse quantization of transform-coded data forming the transform data.

8. A method as recited in claim 7, further comprising performing a quantization of said processed transform data forming processed quantized data.

9. A method as recited in claim 8, further comprising:
   entropy decoding coded data forming the transform-coded data; and entropy encoding the processed quantized data.

10. A method as recited in claim 9, wherein the phenomenon is image data encoded in the JPEG standard format forming coded data.

11. A method as recited in claim 9, wherein said coded data are coded audio data.

12. A method as recited in claim 9, wherein said coded data are coded image data.

13. A method as recited in claim 9, wherein said coded data are coded video data.

14. A method as recited in claim 13, wherein said coded video data are in a MPEG motion video international standard format.

15. A method as recited in claim 1, wherein the step of performing an inverse transform employs an inverse discrete cosine transform.

16. A method as recited in claim 1, further comprising alternating manipulating steps with the steps of performing a forward transform, performing a quantization, entropy encoding, entropy decoding, performing an inverse quantization, and performing an inverse transform a desired number of times.

17. A method as recited in claim 16, wherein said coded data are compressed data, and the steps of performing a forward transform, performing a quantization, entropy encoding, entropy decoding, performing an inverse quantization, and performing an inverse transform implement a compression/decompression cycle.

18. A system employing the method recited in claim 16 to recompress and decompress coded data to enable editing operations.

19. A system for digitally processing first level transform-coded data in the real domain representing a phenomenon, the system comprising:
   a first inverse quantizer to generate transform data from said transform-coded data;
   a first inverse transformer to produce an inverse transform of said transform data to the real domain forming high-precision numbers;
   a first converter and clipper to convert said high-precision numbers to integers and clip the integers to an allowed range forming converted data;
   a first manipulator to manipulate said converted data to produce an effect and forming processed converted data;
   a first selector to select between said high-precision numbers and said processed converted data forming processed high-precision numbers;
   a first forward transformer for forward transforming said processed high-precision numbers forming forward transformed data; and
   a first quantizer for quantizing said forward transformed data to form quantized data.

20. A system as recited in claim 19, wherein the forward transformer employs a different transform type than a first transform type employed by the inverse transformer.

21. A system as recited in claim 19, wherein said forward transformer produces a forward discrete cosine transform and said inverse transformer produces an inverse discrete wavelet transform.

22. A system as recited in claim 19, wherein said inverse quantizer and said quantizer use identical quantization values.

23. A system as recited in claim 19, wherein said inverse quantizer and said quantizer use at least one different quantization value.

24. A system as recited in claim 19, further comprising:
   a first entropy decoder to form the transform-coded data; and
   a first entropy encoder to encode the quantized data.

* * * * *